US011295050B2

(12) United States Patent
Negishi et al.

(10) Patent No.: US 11,295,050 B2
(45) Date of Patent: Apr. 5, 2022

(54) STRUCTURAL ANALYSIS METHOD AND STRUCTURAL ANALYSIS APPARATUS

(71) Applicant: FUJITSU LIMITED, Kawasaki (JP)

(72) Inventors: Takanori Negishi, Nagano (JP); Yasuhiro Kawashima, Nagano (JP); Kazuya Yamaura, Nakano (JP); Masao Fukushima, Suzaka (JP); Tsuyoshi Tamaki, Ueda (JP); Toshio Arai, Nagano (JP); Toshiyasu Ohara, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 508 days.

(21) Appl. No.: 15/962,654

(22) Filed: Apr. 25, 2018

(65) Prior Publication Data
US 2018/0239855 A1 Aug. 23, 2018

Related U.S. Application Data

(63) Continuation of application No. PCT/JP2015/081099, filed on Nov. 4, 2015.

(51) Int. Cl.
G06F 30/23 (2020.01)
G06F 111/10 (2020.01)

(52) U.S. Cl.
CPC .......... *G06F 30/23* (2020.01); *G06F 2111/10* (2020.01)

(58) Field of Classification Search
CPC .......... G06T 17/00; G06T 7/149; G06T 7/60; G06T 17/10; H04L 9/32; G06F 9/48; G06F 17/12; G06F 17/50; G06F 9/52
See application file for complete search history.

(56) References Cited

U.S. PATENT DOCUMENTS

| | | | | |
|---|---|---|---|---|
| 5,815,394 A | * | 9/1998 | Adeli | G06F 30/13 700/97 |
| 2007/0233436 A1 | * | 10/2007 | Ishikawa | G06T 17/20 703/2 |
| 2009/0171636 A1 | * | 7/2009 | Shimizu | G06F 17/12 703/2 |

(Continued)

FOREIGN PATENT DOCUMENTS

| | | |
|---|---|---|
| JP | 4-273375 | 9/1992 |
| JP | 5-73527 | 3/1993 |
| JP | 2011-96190 | 5/2011 |

OTHER PUBLICATIONS

Yadav et al. Large Scale Finite Element Analysis via Assembly-Free Deflated Conjugate Gradient J Comput Int Sci Eng 14(4):41008-1-9, 2014 (Year: 2014).*

(Continued)

*Primary Examiner* — Rehana Perveen
*Assistant Examiner* — Cuong V Luu
(74) *Attorney, Agent, or Firm* — Staas & Halsey LLP

(57) ABSTRACT

A structural analysis method executed by a computer, includes acquiring model information; evaluating based on the acquired model information, a degree of agglomeration of a model subject to analysis; and selecting for the model, a direct method or an iterative method as an algorithm to solve simultaneous linear equations of a structural analysis solver that uses a finite element method, the direct method or the iterative method being selected based on a result of evaluation of the degree of agglomeration of the model.

17 Claims, 23 Drawing Sheets

(56) References Cited

U.S. PATENT DOCUMENTS

2015/0195091 A1* 7/2015 Kubota ............... G06F 21/6227
713/191
2017/0192818 A1* 7/2017 Shimizu ................... G06F 9/52

OTHER PUBLICATIONS

International Search Report dated Feb. 2, 2016 in corresponding International Patent Application No. PCT/JP2015/081099.

Written Opinion of International Search Authority dated Feb. 2, 2016 in corresponding International Patent Application No. PCT/JP2015/081099.

Yamamoto, "Sparse Linear Direct Solvers"; vol. 0 No. 0; pp. 1234-1238; Department of Computational Science and Engineering, Nagoya University, (5 pages) (1 page of English translation of section 2, 2.1).

Toshiyyasu Ohara et al., "Reduction of processing time of FEM structural analysis by a hybrid parallel iterative solver." Proceedings of the Conference on Computational Engineering and Science 19, 4P, Jun. 2014, pp. 4.

Harada, "Finite Element Method Talk, No. 61, Iterative Method Fantasy" (In Japanese, "Yugen Yosoho Yomoyama Banashi, Dai 61 Wa, Hanpukuho no Fantasy"), Femingway [online], Oct. 30, 2014, [retrieved on Jan. 15, 2016], Retrieved from the Internet: <URL:http://web.archive.org/web/20141030130722/http://femingway.com/?p=2394>, pp. 4.

"Phosphor Handbook" (In Japanese, "Keikotai Handbook"), vol. 1, Ohmsha, Ltd., Dec. 25, 1987, pp. 4.

"3-D Thermal Analysis XCOOL, Technical Specification (Node Analysis Module Edition)" (In Japanese, "3-jigen Netsu Kaiseki XCOOL, Gijutsu Setsumeisho (Settenho Kaiseki Module Hen)"), vol. 9, Oki Electric Industry Company, Oct. 1, 1997, pp. 13, 94.

* cited by examiner

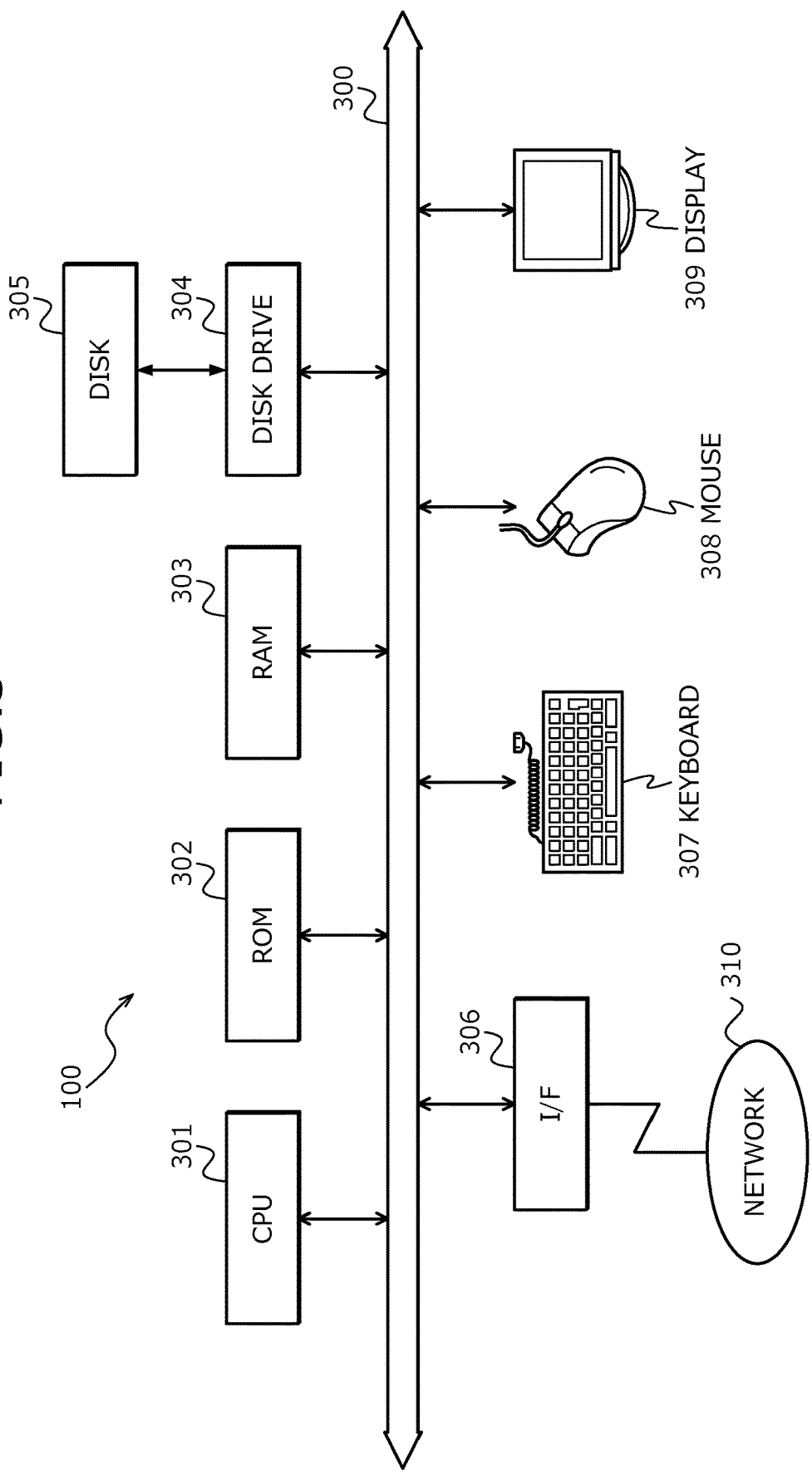

FIG.5

111 MODEL INFORMATION

A

| MODEL ID |
|---|
| ma |

ELEMENT ID
en1,en2,en3,···

B

| ELEMENT ID |
|---|
| en1 |
| ... |

NODE POINT ID
nn1,nn2,nn3,nn4
...

C

| NODE POINT ID |
|---|
| nn1 |
| ... |

NODE POINT POSITION INFORMATION
xn1,yn1
...

D

| MODEL ID | VOLUME | MASS | PRINCIPAL MOMENT OF INERTIA | NUMBER OF NODE POINTS | ELEMENT TYPE | MESH SIZE | NUMBER OF ELEMENTS | NUMBER OF DEGREES OF ANALYSIS FREEDOM | VOLUME OF SMALLEST SPHERE | SURFACE AREA | BOUNDARY CONDITION ||| LOADING CONDITION |
|---|---|---|---|---|---|---|---|---|---|---|---|---|---|---|
| | | | | | | | | | | | CONSTRAINT CONDITION | RESTRAINT AREA | NUMBER OF DEGREES OF CONSTRAINT FREEDOM | GRAVITATIONAL LOADING IN Y-DIRECTION |
| ma | v1 | m1 | I1x,I1y,I1z | n1 | e1 | x1,y1,z1 | e1 | f1 | vb1 | sa1 | ATTACHMENT AT ONE END | a1 | af1 | |

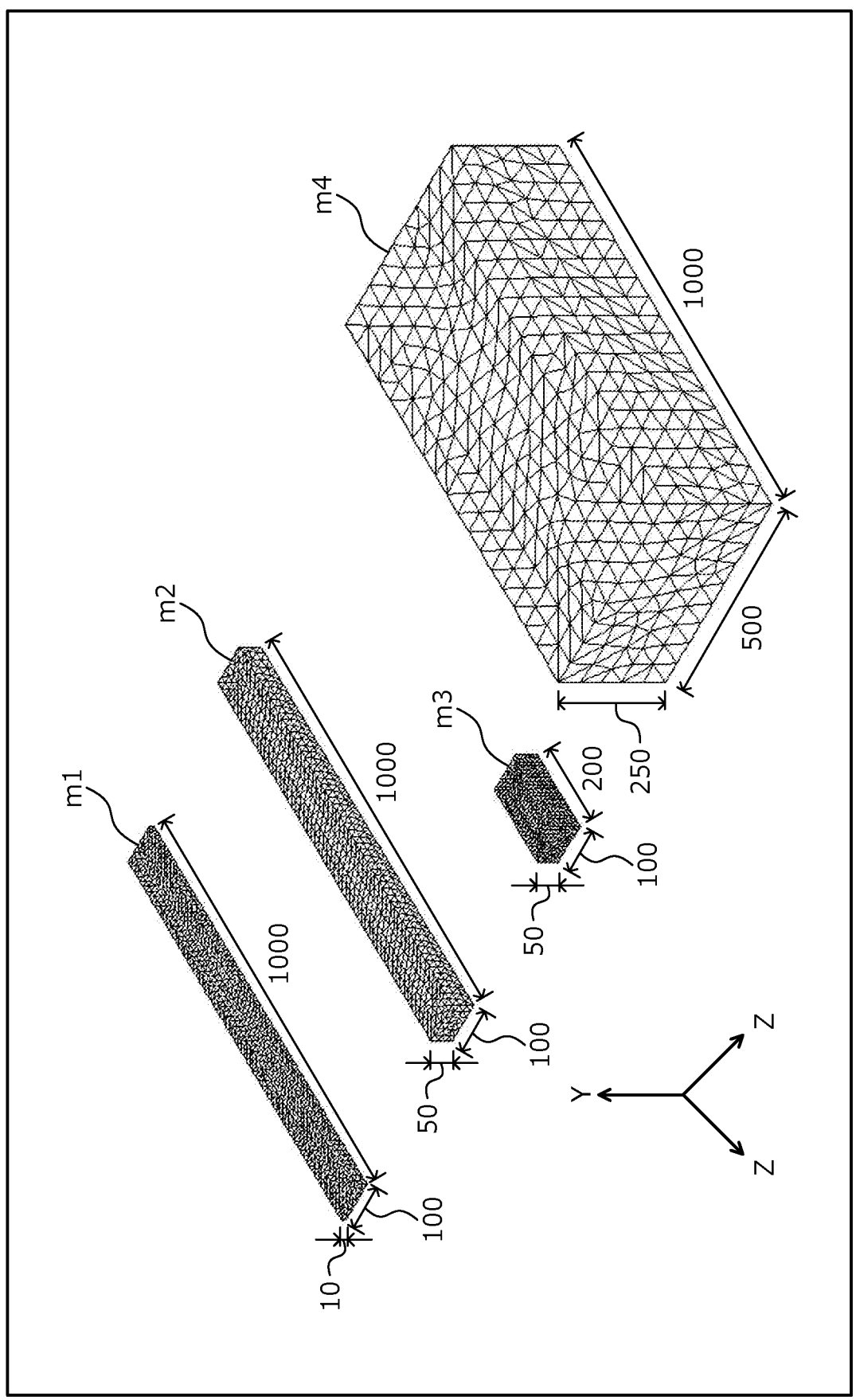

FIG.7

| | MODEL | MODEL m1 | MODEL m2 | MODEL m3 | MODEL m4 | |
|---|---|---|---|---|---|---|
| | DIMENSION (mm) | 10×100×1000 | 50×100×1000 | 50×100×200 | 250×500×1000 | |
| | TYPE OF SHAPE | PLATE-RAFTER-LIKE ARTICLE | PLATE-RAFTER-LIKE ARTICLE | AGGLOMERATION-LIKE ARTICLE | AGGLOMERATION-LIKE ARTICLE | |
| (1) | VOLUME (mm^3) | 1.00E+06 | 5.00E+06 | 1.00E+06 | 1.25E+08 | |
| | SURFACE AREA (mm^2) | 2.22E+05 | 3.10E+05 | 7.00E+04 | 1.75E+06 | |
| | SPECIFIC WEIGHT | 7.85E+00 | 7.85E+00 | 7.85E+00 | 7.85E+00 | |
| (2) | MASS (kg) | 7.85E+00 | 3.93E+01 | 7.85E+00 | 9.81E+02 | |
| | WEIGHT (N) | 7.70E+01 | 3.85E+02 | 7.70E+01 | 9.62E+03 | |
| | <PRINCIPAL MOMENT OF INERTIA> | | | | | |
| (3) | I_XX_P (kg·mm^2) | 6.54E+05 | 3.28E+06 | 2.78E+04 | 8.69E+07 | |
| (4) | I_YY_P (kg·mm^2) | 6.61E+05 | 3.30E+06 | 3.27E+04 | 1.02E+08 | |
| (5) | I_ZZ_P (kg·mm^2) | 6.61E+03 | 4.09E+04 | 8.18E+03 | 2.56E+07 | |
| | <SMALLEST SPHERE COVERING MODEL> | | | | | |
| | DIAMETER (mm) | 1.01E+03 | 1.01E+03 | 2.29E+02 | 1.15E+03 | |
| (6) | VOLUME (mm^3) | 5.32E+08 | 5.33E+08 | 6.30E+06 | 7.87E+08 | |
| (7) | NUMBER OF NODE POINTS | 8,693 | 8,314 | 7,511 | 7,525 | |
| (8) | NUMBER OF ELEMENTS (TETRAHEDRON SECONDARY ELEMENT) | 4,660 | 4,783 | 4,672 | 4,678 | |
| (9) | NUMBER OF DEGREES OF ANALYSIS FREEDOM | 25,994 | 24,669 | 21,858 | 21,900 | |
| (10) | SUM OF NUMBERS OF DEGREES OF ANALYSIS FREEDOM OF EACH OF ELEMENTS | 139,800 | 143,490 | 140,160 | 140,340 | |
| (11) | NUMBER OF NODE POINTS ON SURFACE OF MODEL (SHAPE) | 4,730 | 3,746 | 2,586 | 2,602 | |
| | NUMBER OF NODE POINTS INSIDE MODEL (SHAPE) | 3,963 | 4,568 | 4,925 | 4,923 | <THRESHOLD VALUE> |
| | DETERMINATION METHOD 1 (1)/(6) | 1.88E-03 | 9.37E-03 | 1.59E-01 | 1.59E-01 | → 1.00E-01 |
| | DETERMINATION METHOD 2: $((3)\cdot(4)\cdot(5))/((2)^3)/((1)^2)$ | 5.90E+00 | 2.93E-01 | 1.54E-02 | 1.54E-02 | |
| | INVERSE OF ABOVE | 1.69E-01 | 3.41E+00 | 6.51E+01 | 6.51E+01 | → 4.08E+01 |
| | DETERMINATION METHOD 3 (8)/(7) | 5.36E-01 | 5.75E-01 | 6.22E-01 | 6.22E-01 | → 6.04E-01 |
| | DETERMINATION METHOD 4 (10)/(9) | 5.39E+00 | 5.82E+00 | 6.41E+00 | 6.41E+00 | → 6.18E+00 |
| | DETERMINATION METHOD 5 (7)/(11) | 1.84E+00 | 2.22E+00 | 2.90E+00 | 2.89E+00 | → 2.64E+00 |
| | <ANALYSIS TIME PERIOD> | | | | | |
| (12) | DIRECT METHOD (S) | 0.47 | 0.72 | 1.36 | 1.31 | |
| (13) | ITERATIVE METHOD (S) | 21.3 | 3.06 | 0.91 | 0.92 | |
| | PERFORMANCE RATIO (12)/(13) | 0.02 | 0.24 | 1.49 | 1.42 | |

FIG.8

| | MODEL | MODEL m1 | MODEL m2 | MODEL m3 | MODEL m4 | |
|---|---|---|---|---|---|---|
| | DIMENSION (mm) | 10×100×1000 | 50×100×1000 | 50×100×200 | 250×500×1000 | |
| | TYPE OF SHAPE | PLATE-RAFTER-LIKE ARTICLE | PLATE-RAFTER-LIKE ARTICLE | AGGLOMERATION-LIKE ARTICLE | AGGLOMERATION-LIKE ARTICLE | |
| (1) | VOLUME (mm^3) | 1.00E+06 | 5.00E+06 | 1.00E+06 | 1.25E+08 | |
| | SURFACE AREA (mm^2) | 2.22E+05 | 3.10E+05 | 7.00E+04 | 1.75E+06 | |
| | SPECIFIC WEIGHT | 7.85E+00 | 7.85E+00 | 7.85E+00 | 7.85E+00 | |
| (2) | MASS (kg) | 7.85E+00 | 3.93E+01 | 7.85E+00 | 9.81E+02 | |
| | WEIGHT (N) | 7.70E+01 | 3.85E+02 | 7.70E+01 | 9.62E+03 | |
| | <PRINCIPAL MOMENT OF INERTIA> | | | | | |
| (3) | I_XX_P (kg·mm^2) | 6.54E+05 | 3.28E+06 | 2.78E+04 | 8.69E+07 | |
| (4) | I_YY_P (kg·mm^2) | 6.61E+05 | 3.30E+06 | 3.27E+04 | 1.02E+08 | |
| (5) | I_ZZ_P (kg·mm^2) | 6.61E+03 | 4.09E+04 | 8.18E+03 | 2.56E+07 | |
| | <SMALLEST SPHERE COVERING MODEL> | | | | | |
| | DIAMETER (mm) | 1.01E+03 | 1.01E+03 | 2.29E+02 | 1.15E+03 | |
| (6) | VOLUME (mm^3) | 5.32E+08 | 5.33E+08 | 6.30E+06 | 7.87E+08 | |
| (7) | NUMBER OF NODE POINTS | 17,884 | 16,046 | 14,756 | 14,745 | |
| (8) | NUMBER OF ELEMENTS (TETRAHEDRON SECONDARY ELEMENT) | 9,651 | 9,828 | 9,612 | 9,598 | |
| (9) | NUMBER OF DEGREES OF ANALYSIS FREEDOM | 53,343 | 47,745 | 43,281 | 43,260 | |
| (10) | SUM OF NUMBERS OF DEGREES OF ANALYSIS FREEDOM OF EACH OF ELEMENTS | 289,530 | 294,840 | 288,360 | 287,940 | |
| (11) | NUMBER OF NODE POINTS ON SURFACE OF MODEL (SHAPE) | 9,586 | 5,910 | 4,022 | 4,034 | |
| | NUMBER OF NODE POINTS INSIDE MODEL (SHAPE) | 8,258 | 10,136 | 10,734 | 10,711 | <THRESHOLD VALUE> |
| | DETERMINATION METHOD1 (1)/(6) | 1.88E-03 | 9.37E-03 | 1.59E-01 | 1.59E-01 | → 6.32E-02 |
| | DETERMINATION METHOD2: $((3)\cdot(4)\cdot(5))/((2)^3)/((1)^2)$ | 5.90E+00 | 2.93E-01 | 1.54E-02 | 1.54E-02 | |
| | INVERSE OF ABOVE | 1.69E-01 | 3.41E+00 | 6.51E+01 | 6.51E+01 | → 2.56E+01 |
| | DETERMINATION METHOD3 (8)/(7) | 5.41E-01 | 6.12E-01 | 6.51E-01 | 6.51E-01 | → 6.27E-01 |
| | DETERMINATION METHOD4 (10)/(9) | 5.43E+00 | 6.18E+00 | 6.66E+00 | 6.66E+00 | → 6.35E+00 |
| | DETERMINATION METHOD5 (7)/(11) | 1.86E+00 | 2.72E+00 | 3.67E+00 | 3.66E+00 | → 3.06E+00 |
| | <ANALYSIS TIME PERIOD> | | | | | |
| (12) | DIRECT METHOD (S) | 1.33 | 2.35 | 5.09 | 5.52 | |
| (13) | ITERATIVE METHOD (S) | 49.15 | 7.69 | 2.28 | 2.3 | |
| | PERFORMANCE RATIO (12)/(13) | 0.03 | 0.31 | 2.23 | 2.40 | |

FIG.9

| NUMBER OF ELEMENTS | DETERMINATION METHOD 1 (THRESHOLD VALUE th1) | DETERMINATION METHOD 2 (THRESHOLD VALUE th2) | DETERMINATION METHOD 3 (THRESHOLD VALUE th3) | DETERMINATION METHOD 4 (THRESHOLD VALUE th4) | DETERMINATION METHOD 5 (THRESHOLD VALUE th5) |
|---|---|---|---|---|---|
| 3000 | th11 | th21 | th31 | th41 | th51 |
| 5000 | th12 | th22 | th32 | th42 | th52 |
| 7000 | th13 | th23 | th33 | th43 | th53 |
| 10000 | th14 | th24 | th34 | th44 | th54 |

FIG.10

| MODEL | | ANALYSIS MODEL |
|---|---|---|
| | DIMENSION (mm) | 50×100×500 |
| | TYPE OF SHAPE | - |
| (1) | VOLUME (mm^3) | 2.50E+06 |
| | SURFACE AREA (mm^2) | 1.60E+05 |
| | SPECIFIC WEIGHT | 7.85E+00 |
| (2) | MASS (kg) | 1.96E+01 |
| | WEIGHT (N) | 1.92E+02 |
| | <PRINCIPAL MOMENT OF INERTIA> | |
| (3) | I_XX_P (kg·mm^2) | 4.13E+05 |
| (4) | I_YY_P (kg·mm^2) | 4.25E+05 |
| (5) | I_ZZ_P (kg·mm^2) | 2.04E+04 |
| | <SMALLEST SPHERE COVERING SHAPE> | |
| | DIAMETER (mm) | 5.12E+02 |
| (6) | VOLUME (mm^3) | 7.04E+07 |
| (7) | NUMBER OF NODE POINTS | 7,887 |
| (8) | NUMBER OF ELEMENTS (TETRAHEDRON SECONDARY ELEMENT) | 4,724 |
| (9) | NUMBER OF DEGREES OF ANALYSIS FREEDOM | 22,959 |
| (10) | SUM OF NUMBERS OF DEGREES OF ANALYSIS FREEDOM OF EACH OF ELEMENTS | 141,720 |
| (11) | NUMBER OF NODE POINTS ON SURFACE OF MODEL (SHAPE) | 3,162 |
| | NUMBER OF NODE POINTS INSIDE MODEL (SHAPE) | 4,725 |

| | | | <THRESHOLD VALUE> | |
|---|---|---|---|---|
| DETERMINATION METHOD1 (1)/(6) | | 3.55E-02 | < 1.00E-01 | SELECT DIRECT METHOD |
| DETERMINATION METHOD2 | ((3)·(4)·(5))/((2)^3)/((1)^2) | 7.60E-02 | | |
| | INVERSE OF ABOVE | 1.32E+01 | < 4.08E+01 | SELECT DIRECT METHOD |
| DETERMINATION METHOD 3 (8)/(7) | | 5.99E-01 | < 6.04E-01 | SELECT DIRECT METHOD |
| DETERMINATION METHOD 4 (10)/(9) | | 6.17E+00 | < 6.18E+00 | SELECT DIRECT METHOD |
| DETERMINATION METHOD 5 (7)/(11) | | 2.49E+00 | < 2.64E+00 | SELECT DIRECT METHOD |

| | <ANALYSIS TIME PERIOD> | |
|---|---|---|
| (12) | DIRECT METHOD (S) | |
| (13) | ITERATIVE METHOD (S) | |
| | PERFORMANCE RATIO (12)/(13) | |

FIG.12

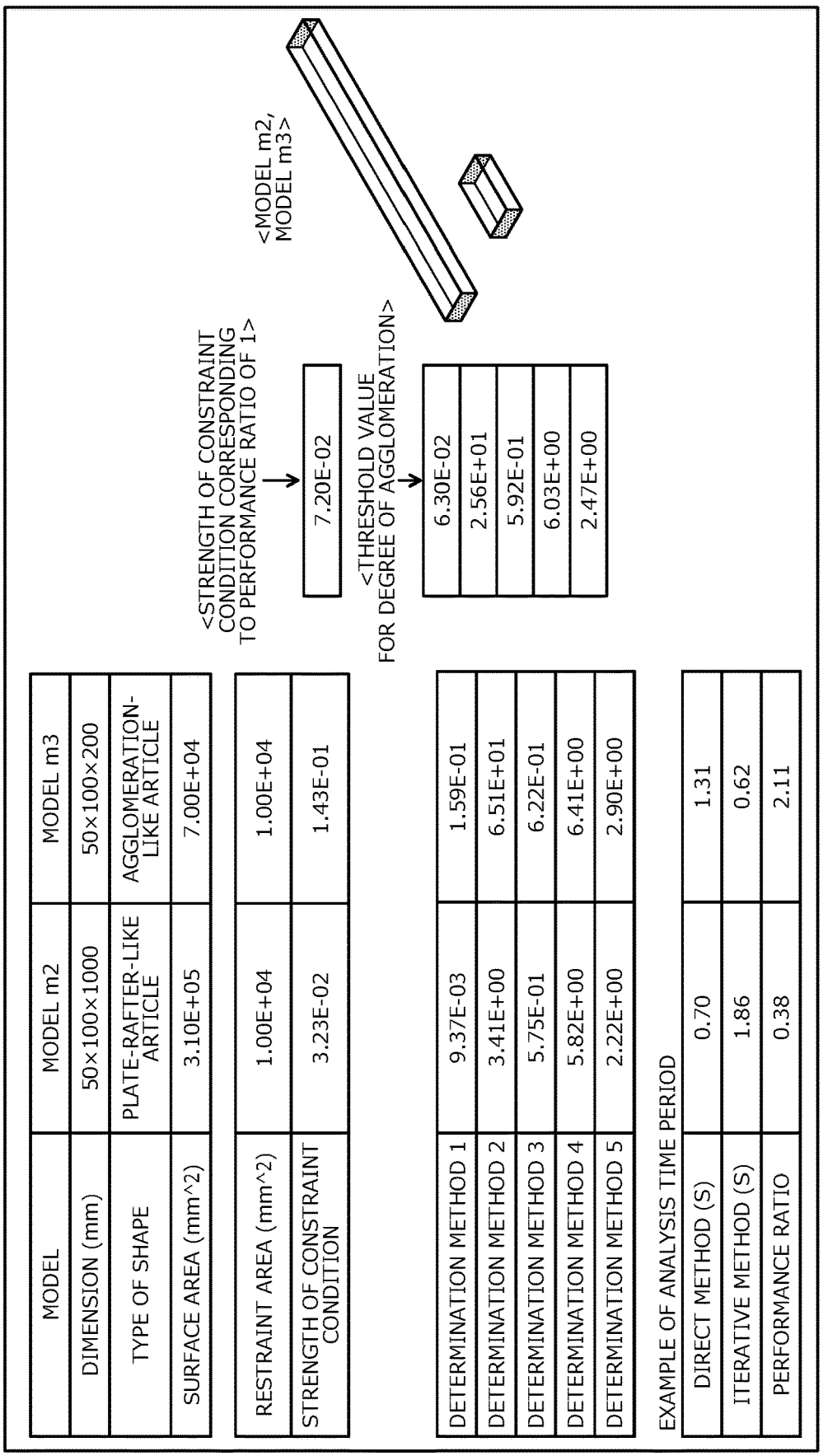

| MODEL | MODEL m2 | MODEL m3 |
|---|---|---|
| DIMENSION (mm) | 50×100×1000 | 50×100×200 |
| TYPE OF SHAPE | PLATE-RAFTER-LIKE ARTICLE | AGGLOMERATION-LIKE ARTICLE |
| SURFACE AREA (mm^2) | 3.10E+05 | 7.00E+04 |
| RESTRAINT AREA (mm^2) | 1.00E+04 | 1.00E+04 |
| STRENGTH OF CONSTRAINT CONDITION | 3.23E-02 | 1.43E-01 |
| DETERMINATION METHOD 1 | 9.37E-03 | 1.59E-01 |
| DETERMINATION METHOD 2 | 3.41E+00 | 6.51E+01 |
| DETERMINATION METHOD 3 | 5.75E-01 | 6.22E-01 |
| DETERMINATION METHOD 4 | 5.82E+00 | 6.41E+00 |
| DETERMINATION METHOD 5 | 2.22E+00 | 2.90E+00 |

EXAMPLE OF ANALYSIS TIME PERIOD

| DIRECT METHOD (S) | 0.70 | 1.31 |
|---|---|---|
| ITERATIVE METHOD (S) | 1.86 | 0.62 |
| PERFORMANCE RATIO | 0.38 | 2.11 |

<STRENGTH OF CONSTRAINT CONDITION CORRESPONDING TO PERFORMANCE RATIO OF 1>

7.20E-02

<THRESHOLD VALUE FOR DEGREE OF AGGLOMERATION>

| 6.30E-02 |
| 2.56E+01 |
| 5.92E-01 |
| 6.03E+00 |
| 2.47E+00 |

FIG.18

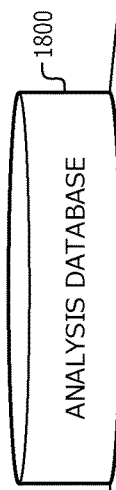

ANALYSIS DATABASE 1800

| MODEL ID | DEGREE OF AGGLOM-ERATION 1 | DEGREE OF AGGLOM-ERATION 2 | DEGREE OF AGGLOM-ERATION 3 | DEGREE OF AGGLOM-ERATION 4 | DEGREE OF AGGLOM-ERATION 5 | STRENGTH OF BOUNDARY CONDITION | MODEL SCALE | ANALYSIS TIME PERIOD OF DIRECT METHOD A | ANALYSIS TIME PERIOD OF DIRECT METHOD B | ANALYSIS TIME PERIOD OF ITERATIVE METHOD C | ANALYSIS TIME PERIOD OF ITERATIVE METHOD D |
|---|---|---|---|---|---|---|---|---|---|---|---|
| ma | a11 | a21 | a31 | a41 | a51 | st1 | sc1 | tt11 | tt21 | tt31 | tt41 |
| mb | a12 | a22 | a32 | a42 | a52 | st2 | sc2 | tt12 | tt22 | tt32 | tt42 |
| ... | ... | ... | ... | ... | ... | ... | ... | ... | ... | ... | ... |

| SERVER ID | STATE | MEMORY CAPACITY | NUMBER OF CPUs |
|---|---|---|---|
| 1 | NOT USED | mm1 | c1 |
| 2 | NOT USED | mm2 | c2 |
| 3 | IN USE | mm3 | c3 |
| 4 | NOT USED | mm4 | c4 |
| ... | ... | ... | ... |

<DEFINITION OF MEMORY CAPACITY>
　　$mm1=mm2=mm3<mm4$
　　　$(mm1+mm2<mm4)$

<DEFINITION OF NUMBER OF CPUs>
　　$c1=c2=c3<c4$

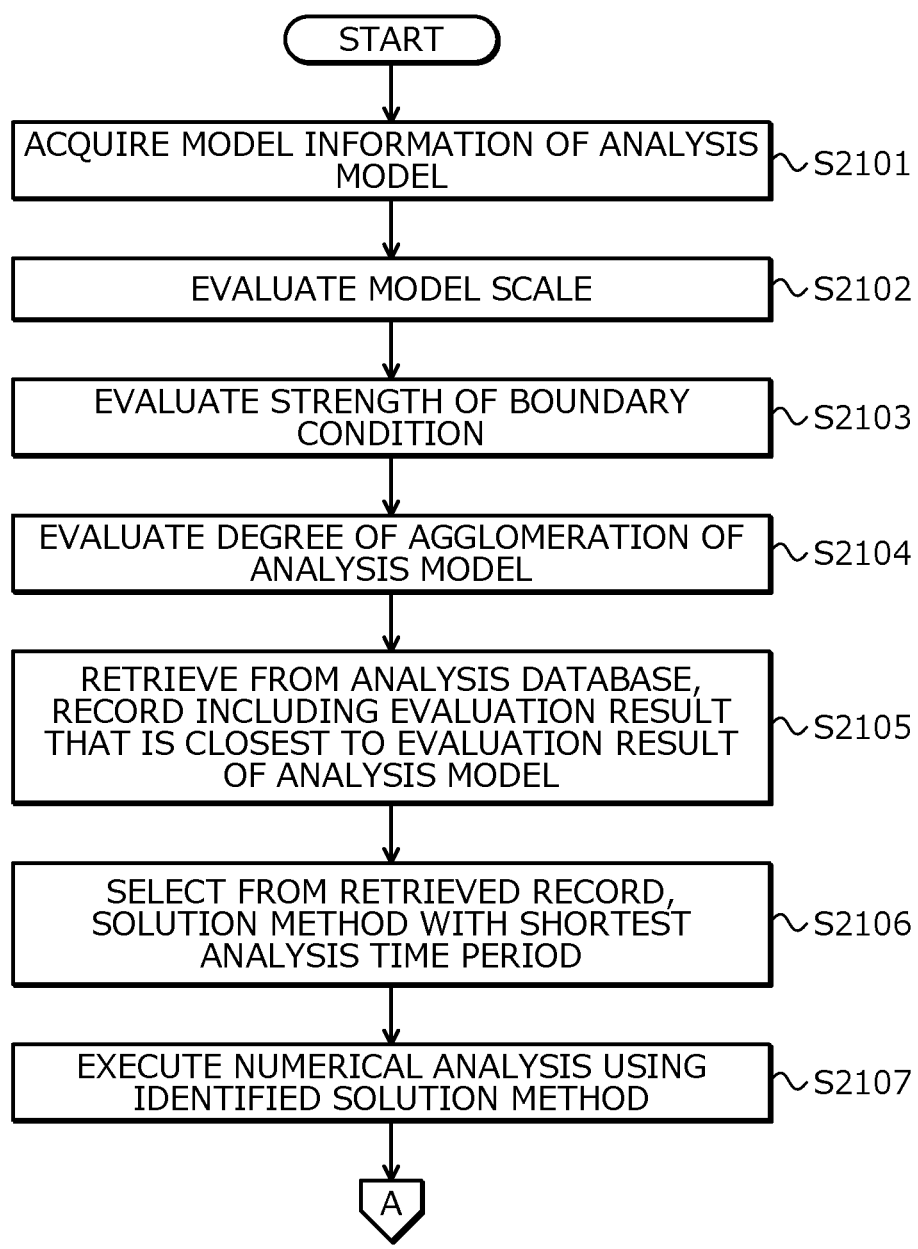

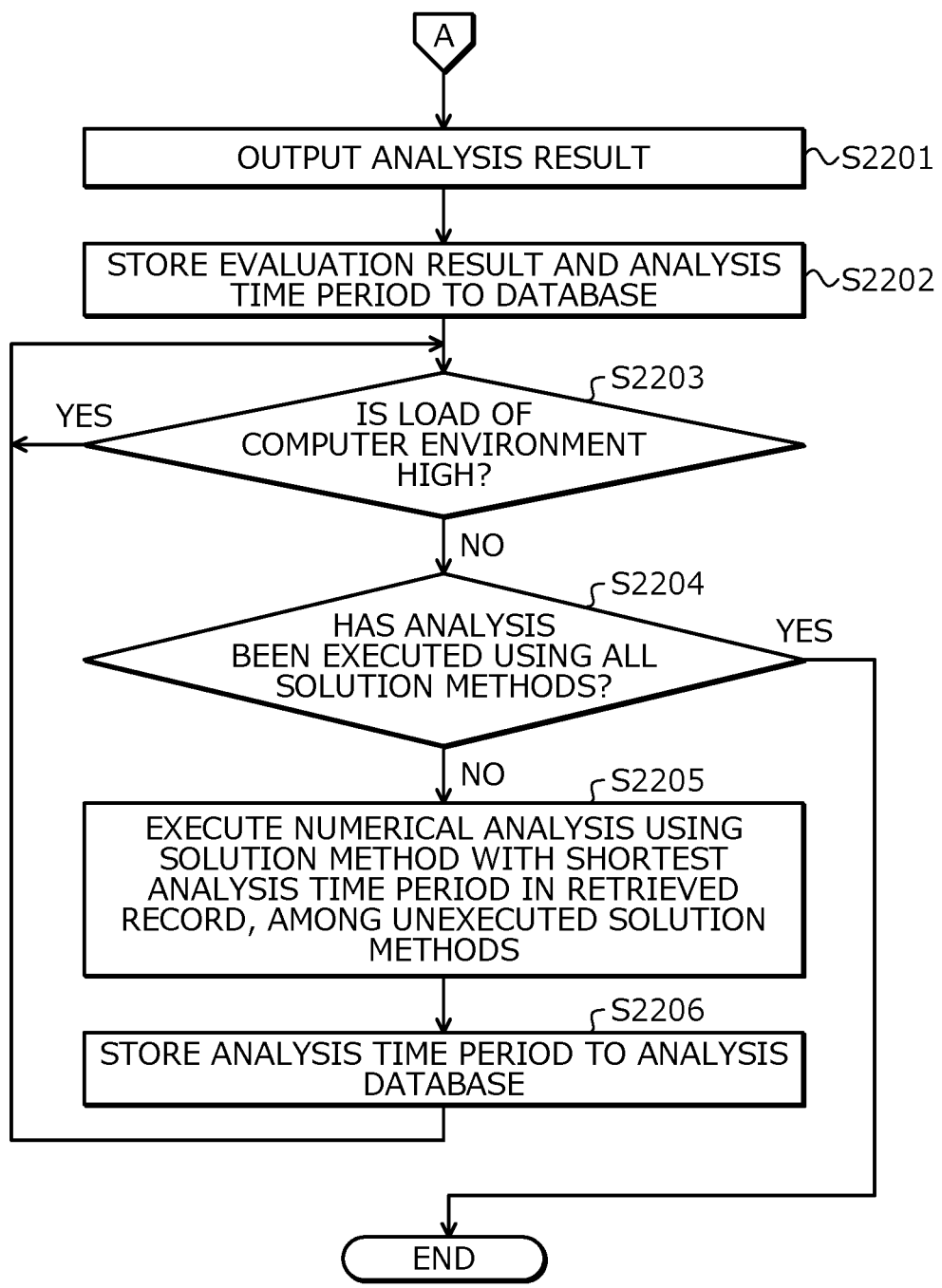

STRUCTURAL ANALYSIS METHOD AND STRUCTURAL ANALYSIS APPARATUS

CROSS REFERENCE TO RELATED APPLICATIONS

This application is a continuation application of International Application PCT/JP2015/081099, filed on Nov. 4, 2015, and designating the U.S., the entire contents of which are incorporated herein by reference.

FIELD

The embodiments discussed herein relate to a structural analysis method and a structural analysis apparatus.

BACKGROUND

A technique of executing a structural analysis using a finite element method is traditionally known. With the structural analysis using a finite element method, displacements and stresses of a structure are determined by, for example, solving simultaneous linear equations. A large amount of calculation is necessary and a long time period is therefore necessary to solve the simultaneous linear equations, and various techniques are therefore present to solve the simultaneous linear equations at a high speed using a computer. Examples of a solution method for the simultaneous linear equations include, for example, a direct method and an iterative method as broad classifications. The direct method is a solution method of directly determining the solution by, for example, triangulating a coefficient matrix and, in contrast, the iterative method is a solution method of determining an approximate solution by executing iterative calculation.

For algorisms that are for solving the simultaneous linear equations and that are represented by the direct method and the iterative method, various technical developments are currently conducted to solve the simultaneous linear equations at a higher speed by more efficiently using a computer. For example, Yusaku Yamamoto, "Direct Solvers for Sparse Linear Systems", Computational Engineering and Science, Vol. 11, No. 4, pp. 14-18 (2006) introduces an algorithm for a direct method, suitable for a sparse matrix. Toshiyasu Ohara, Yasuhiro Kawashima, and Seiji Fujino, "Reduction of processing time of FEM structural analysis by a hybrid parallel iterative solver", Proceedings of the Conference on Computational Engineering and Science 19, 4 p, 2014-06 introduces an algorithm for an iterative method, that is suitable for parallel processing and an example of calculation thereof.

SUMMARY

According to an aspect of an embodiment, a structural analysis method executed by a computer, includes acquiring model information; evaluating based on the acquired model information, a degree of agglomeration of a model subject to analysis; and selecting for the model, a direct method or an iterative method as an algorithm to solve simultaneous linear equations of a structural analysis solver that uses a finite element method, the direct method or the iterative method being selected based on a result of evaluation of the degree of agglomeration of the model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram depicting an example of hardware configuration of the structural analysis apparatus;

FIG. 5 is an explanatory diagram of an example of model information;

FIG. 6 is an explanatory diagram of an example of a model used for derivation of a threshold value;

FIG. 7 is an explanatory diagram of an example of the derivation of the threshold value for a case where a number of elements is 5,000;

FIG. 8 is an explanatory diagram of an example of the derivation of the threshold value for a case where the number of elements is 10,000;

FIG. 9 is an explanatory diagram of an example of the threshold value that corresponds to model scale;

FIG. 10 is an explanatory diagram of an example of calculation of a degree of agglomeration and an example of selection of a solution method;

FIG. 12 is an explanatory diagram of an example of the derivation of the threshold value for the degree of agglomeration in a case where the constraint condition is that of an attachment at both ends;

FIG. 18 is an explanatory diagram of an example of an analysis database;

FIG. 20 is an explanatory diagram of an example of management of a state of a server and memory capacity;

FIG. 21 is a flowchart of an exemplary procedure for a structural analysis process executed by the system; and FIG. 22 is a flowchart of the exemplary procedure for the structural analysis process executed by the system.

DESCRIPTION OF THE INVENTION

First problems associated with the related arts will be described. Solution methods of simultaneous linear equations have strengths and weakness and no solution method exists that is fastest and reliably solves all problems. Therefore, when the numerical analysis is executed using an algorithm for solving the simultaneous linear equations of the structural analysis solver that uses the finite element method for an analysis model, as a specific solution method, a problem arises in that, depending on the model, the analysis time period becomes longer than that in a case where another solution method is used. For example, with a direct method, due to a property of the simultaneous linear equations, when the nonzero areas are increased, the amount of computations and memory required may increase and the analysis time period may increase. On the other hand, for example, with an iterative method, due to the property of the simultaneous linear equations, the solution may tend to not converge and the analysis time period may increase.

Embodiments of a structural analysis method and a structural analysis program according to an embodiment of the present invention will be described in detail with reference to the accompanying drawings.

Figure 1:
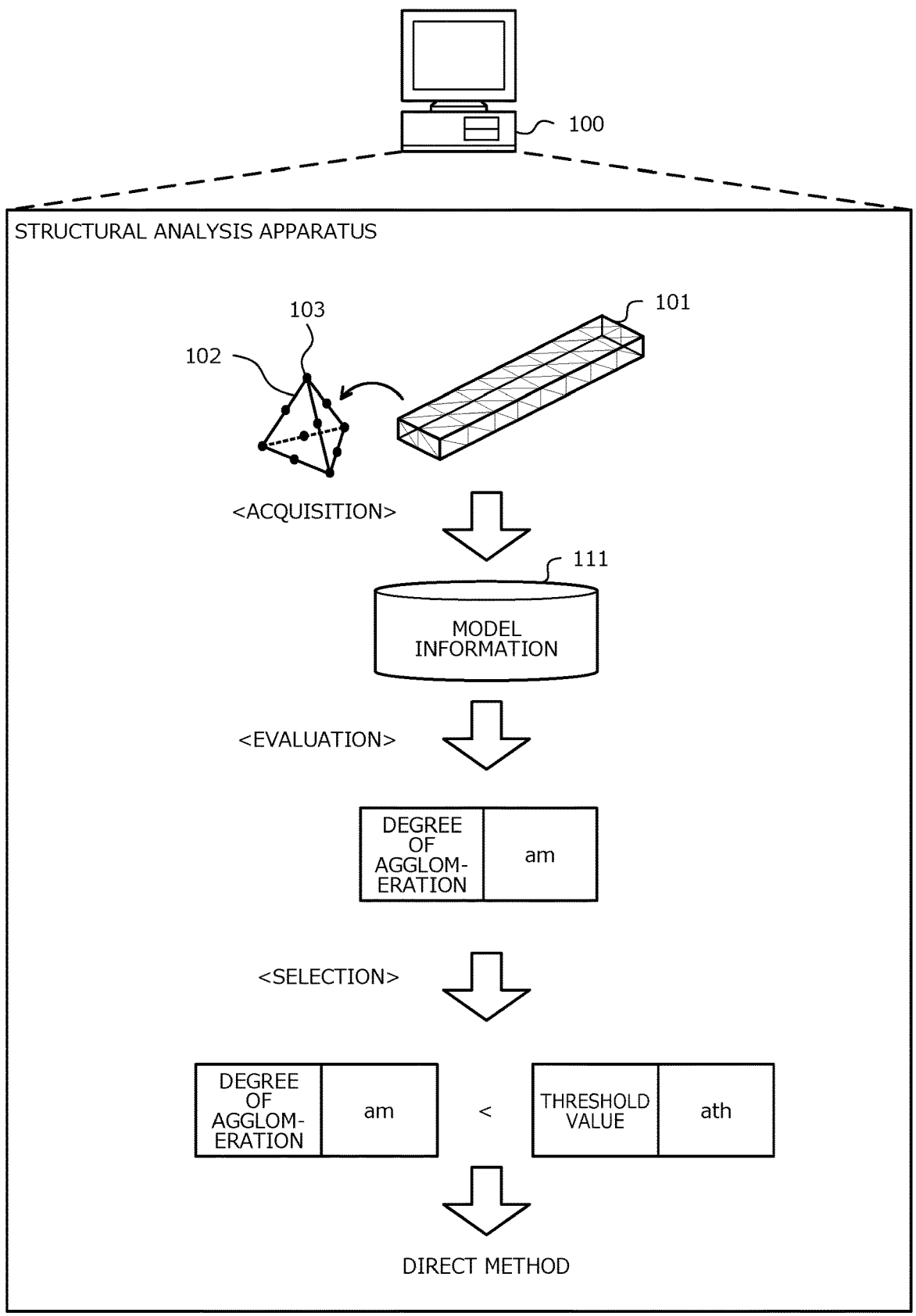
FIG. 1 is an explanatory diagram of an example of an operation by a structural analysis apparatus according to an embodiment of the present invention.

FIG. 1 is an explanatory diagram of an example of an operation by the structural analysis apparatus according to an embodiment of the present invention. A structural analysis apparatus 100 is a computer that executes a structural analysis using a finite element method for a finite element method (FEM) model to be analyzed. The finite element method is a method for a numerical analysis to solve a differential equation by approximation. In the evaluation based on the structural analysis, for example, a displacement as an index of the stiffness, a stress as an index of the strength, and the like are evaluated.

The FEM model to be analyzed will hereinafter be also referred to simply as "model", "analysis model", or the like. The finite element method is a method according to which a region for which equations are defined is divided into small regions and the equation for each of the small regions is approximated using a common interpolation function. The small region will be referred to as "element 102". The element 102 has node points 103 arranged at its vertexes and the like. In the structural analysis using the finite element method, a region for which equations are defined is a structure to be analyzed. The analysis model is a model for which structural analysis using the FEM is enabled by approximation of the structure to be analyzed, and is arranged in a simulation space.

The simulation space is a space set to present, on the computer, a region to be analyzed that includes the inside of the physical structure to be analyzed and the space outside the structure. As to the analysis model, the structure to be analyzed is divided into the plural elements 102 and the overall shape is presented as an aggregation of the elements 102. The aggregation of the elements 102 is also referred to as "mesh". The size of one lattice cell of the mesh is also referred to as "mesh size".

The shape of each one of the elements 102 is, in two dimensions, a tetragon, a triangle, or the like and is, in three dimensions, a tetrahedron, a pentahedron, a hexahedron, or the like. In FIG. 1, as a secondary element, while a tetrahedron is taken as an example of the element 102, examples of the shape of the element 102 and the relation between the element 102 and the node point 103 will be described in detail with reference to FIGS. 2A to 2C.

Using, for example, a computer aided design (CAD), a developer produces three-dimensional model information regarding a three-dimensional model having a three-dimensional shape, that represents a structure using polygons. The three-dimensional model information includes, for example, coordinate data of the polygons, and the like. Using computer aided engineering (CAE), the developer simulates on the computer before the structure is actually produced, whether the designed structure satisfies the required performance. The CAE includes, for example, three pieces of software that are called "preprocessor", "solver", and "postprocessor".

The preprocessor of the CAE may produce model information that indicates an FEM model by executing mesh division and defining the boundary conditions. The solver of the CAE is a structural analysis solver that executes a numerical analysis for the FEM model indicated by the model information 111. Finally, the postprocessor of the CAE executes visualization of the analysis result acquired by the solver of the CAE.

With the structural analysis using the FEM, the displacements and the stresses of the structure may be determined traditionally by solving force equilibrium equations. The force equilibrium equations are simultaneous linear equations. The simultaneous linear equations are also represented by [Ku=f]. "K" is a stiffness matrix. "u" is a vector representing the displacement of each degree of freedom of each of the node points 103. "u" is an unknown vector to be determined using the analysis. "f" is a vector representing loading. "f" is a loading value that corresponds to the degree of freedom of each of the node points 103 in a case where a loading condition is set.

A large amount of calculation and a long time period are traditionally necessary for solving simultaneous linear equations, and various approaches have therefore been developed to solve the simultaneous linear equations using a computer at a higher speed. Examples of a method of solving the simultaneous linear equations include a direct method and an iterative method. The direct method is a solution method of directly determining the solution by triangulating the coefficient matrix. Examples of the direct method include, for example, a multi-frontal method. The iterative method is a solution method of determining an approximate solution by executing iterative calculation. Examples of the iterative method include, for example, a preprocessed CG method.

With the traditional technique, however, when the numerical analysis is executed using an algorithm for solving the simultaneous linear equations of the structural analysis solver that uses the finite element method for the analysis model, as a specific solution method, a problem arises in that, depending on the model, the analysis time period becomes longer than that in a case where another solution method is used. For example, execution of the direct method generally needs a larger memory capacity than that for execution of the iterative method. With the direct method, due to the property of the simultaneous linear equations, when non-zero areas are increased, a larger amount of computation and a larger memory capacity are necessary and the analysis time period may be increased. For example, with the direct method, the analysis time period may be increased when the shape of the analysis model is an agglomeration-like shape. On the other hand, for example, with the iterative method, the solution may tend to not converge due to the property of the simultaneous linear equations and the analysis time period may be long. For example, with the iterative method, the analysis time period may be long when the shape of the analysis model is a plate-rafter-like shape.

In the present embodiment, the structural analysis apparatus 100 evaluates the degree of agglomeration of the analysis model as the property of the simultaneous linear equations, based on the information indicating the shape of the analysis model, and from, for example, the direct method and the iterative method, selects a solution method based on the simultaneous linear equations using the finite element method. Based on this, whether the shape of the analysis model is a shape that is close to an agglomeration-like shape or a shape close to a plate-rafter-like shape may be determined. The solution method according to the property of the simultaneous linear equations may therefore be selected and reduction of the analysis time period may be facilitated.

The structural analysis apparatus 100 first acquires the model information 111. The model information 111 includes, for example, information indicating the shape of a model 101 to be analyzed. A detailed example of the model information 111 will be described with reference to FIG. 5 described later.

The structural analysis apparatus 100 evaluates the degree of agglomeration of the model 101 to be analyzed based on the acquired model information 111.

The degree of agglomeration is an index value indicating, for example, whether the shape of the analysis model formed by an element group included in the analysis model is a shape of a thick aggregation. A higher degree of agglomeration indicates that the shape of the analysis model formed by the element group included in the analysis model is more likely to be a shape of a thick aggregation. A lower degree of agglomeration indicates that the shape of the analysis model formed by the element group included in the analysis model is more likely to be a shape that is thin and flat.

Alternatively, the degree of agglomeration is an index value indicating, for example, whether the shape of a structure formed by the material or members included in the structure represented by the model is a shape of a thick aggregation. A higher degree of agglomeration indicates that the shape of the structure formed by the material or the members included in the structure is more likely to be a shape of a thick aggregation. A lower degree of agglomeration indicates that the shape of the structure formed by the material or the members included in the structure is more likely to be thin, and flat or slim. For example, the model or the structure having a shape formed by the element group, the material, or the members that is/are thin, and flat or slim is also referred to as "plate-rafter-like article". For example, the model or the structure having a shape formed by the element group, the material, or the members that lump(s) to be thick is also referred to as "agglomeration-like article".

The degree of agglomeration of the model 101 to be analyzed may be evaluated based on, for example, the volume of the model 101 to be analyzed. The degree of agglomeration of the model 101 to be analyzed may be evaluated based on, for example, information regarding the volume of the model 101 to be analyzed and the weight of the model 101 to be analyzed. The degree of agglomeration of the model 101 to be analyzed may be evaluated based on, for example, the elements 102 and the node points 103 included in the model 101 to be analyzed. For example, the degree of agglomeration of the model 101 to be analyzed is evaluated by determination methods 1 to 5 described later and the like.

The structural analysis apparatus 100 selects for the structural analysis solver that uses the finite element method of the model 101 to be analyzed, for example, the direct method or the iterative method as the algorithm for solving the simultaneous linear equations, the structural analysis apparatus 100 makes the selection based on the result of the evaluation of the degree of agglomeration of the model 101 to be analyzed. For example, the structural analysis apparatus 100 selects the iterative method when the degree of agglomeration is equal to a threshold value or higher, and selects the direct method when the degree of agglomeration is lower than the threshold value. The structural analysis apparatus 100 thereby more strongly tends to be able to select the iterative method when the degree of agglomeration is higher. In the example depicted in FIG. 1, the structural analysis apparatus 100 selects the direct method because the degree of agglomeration "am" is lower than the threshold value "ath".

When the model 101 to be analyzed is a plate-rafter-like article, the solution does not converge in the iterative method and the analysis takes a long time described above. Reduction of the analysis time period may therefore be facilitated by selecting the direct method when the degree of agglomeration is low. When the model 101 to be analyzed is an agglomeration-like article, the non-zero areas in the coefficient matrix and the triangular matrix are increased in the direct method and the analysis therefore takes a long time. Reduction of the analysis time period may be facilitated by selecting the iterative method when the degree of agglomeration is high. In this manner, the property of the simultaneous linear equations may be determined and reduction of the analysis time period may be facilitated by determining the feature of the shape of the model 101 to be analyzed based on the degree of agglomeration.

Figure 2A:
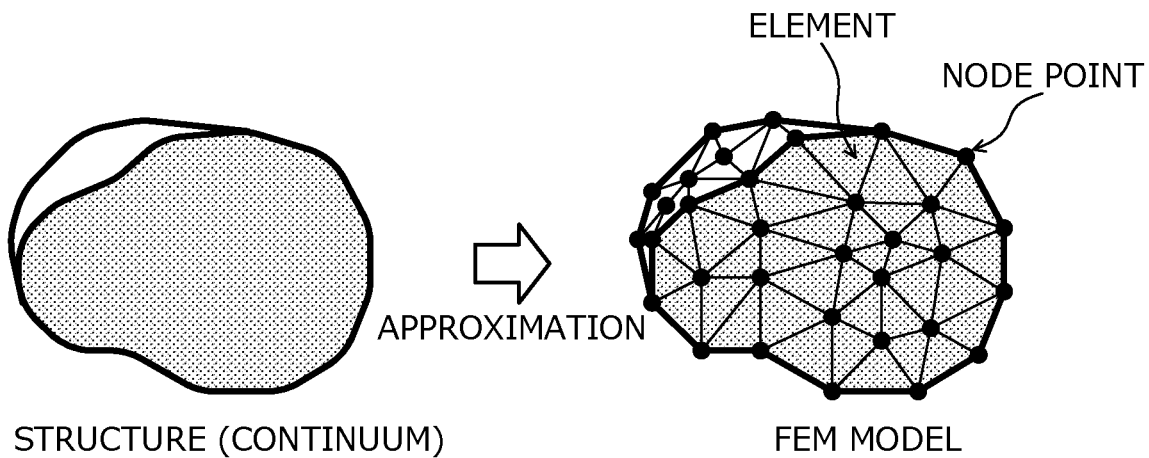
FIG. 2A is an explanatory diagram of elements and node points are used in structural analysis using a finite element method.
Figure 2B:
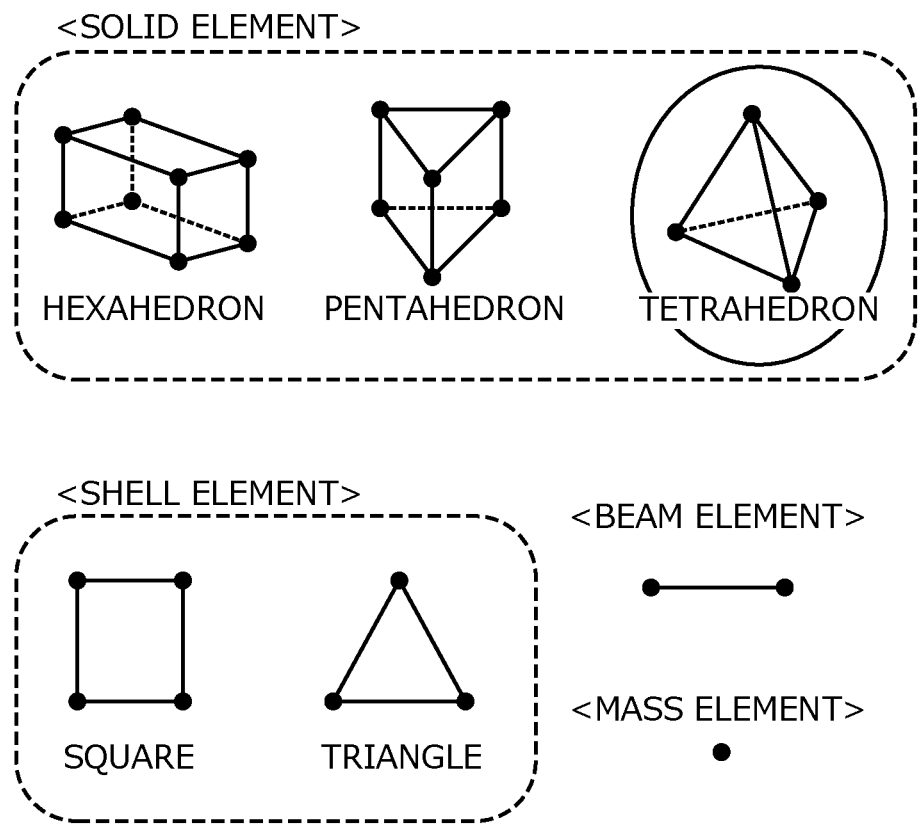
FIG. 2B is an explanatory diagram of elements and node points are used in structural analysis using a finite element method.
Figure 2C:
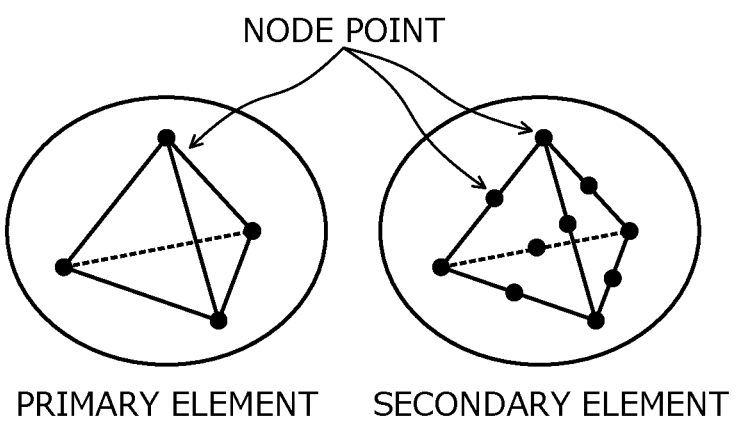
FIG. 2C is an explanatory diagram of elements and node points are used in structural analysis using a finite element method.

FIGS. 2A, 2B, and 2C are explanatory diagrams of the elements and the node points that are used in the structural analysis using the finite element method. As depicted in FIG. 2A, the structure is, for example, a continuum. As described above, the preprocessor of the CAE produces the FEM model by approximating a three-dimensional model of the structure, produced in the three-dimensional simulation space.

As depicted in FIG. 2B, examples of the element type include a three-dimensional solid element, a two-dimensional shell element, a one-dimensional beam element, a one-dimensional truss element, and a zero-dimensional mass element. Examples of the shape of the solid element include a hexahedron, a pentahedron, and a tetrahedron. Examples of the shape of the shell element include a tetragon and a triangle. The shape of each of the beam element and the truss element is a line. The shape of the mass element is a point.

As depicted in FIG. 2C, for example, when the shape of the element is a tetrahedron, plural definition methods for node points are present such as a primary element and a secondary element. For the primary element, the node points included in the element are vertexes of the tetrahedron. For the secondary element, the node points are the vertexes of the tetrahedron and the middle point of each of the lines each connecting the vertexes. In this manner, the number of the node points constituting the element differs depending on the shape of the element and the definition method for the node point. In the present embodiment, description will be made using the secondary element of the tetrahedron as the element type.

The solid element is also referred to as "solid substance element". The shell element is also referred to as, for example, "plate element". The beam element is also referred to as "rafter element". The degree of analysis freedom of each of the constituent node points described later differs depending on the element type.

FIG. 3 is a block diagram depicting an example of hardware configuration of the structural analysis apparatus. In FIG. 3, the structural analysis apparatus 100 has a central processing unit (CPU) 301, a read-only memory (ROM) 302, a random access memory (RAM) 303, a disk drive 304, and a disk 305. Further, the structural analysis apparatus 100 has an interface (I/F) 306, a keyboard 307, a mouse 308, and a display 309. Further, the CPU 301, the ROM 302, the RAM 303, the disk drive 304, the I/F 306, the keyboard 307, the mouse 308, and the display 309 are respectively connected by a bus 300.

Here, the CPU 301 governs overall control of the structural analysis apparatus 100. The ROM 302 stores programs such as a boot program. The RAM 303 is used as a work area of the CPU 301. The disk drive 304, under the control of the CPU 301, controls the reading and writing of data with respect to the disk 305. The disk 305 stores data written thereto under the control of the disk drive 304. A magnetic disk, an optical disk, or the like may be used as the disk 305.

The I/F 306 is connected through a communications line to a network 310 such as a local area network (LAN), a wide area network (WAN), the Internet, etc. and is connected to other apparatuses through the network 310. The I/F 306 administers an internal interface with the network 310 and controls the input and output of data from other apparatuses. For example, a modem, a LAN adapter, etc. may be employed as the I/F 306.

The keyboard 307 and the mouse 308 are interfaces that input various types of data by user operation. The display 309 is an interface that outputs data according to instructions from the CPU 301.

Although not depicted, the structural analysis apparatus 100 may be further equipped with an input device that takes in images and moving pictures from a camera, an input device that takes in sound from a microphone, etc. Although not depicted, the structural analysis apparatus 100 may be further equipped with an output device such as a printer.

Figure 4:
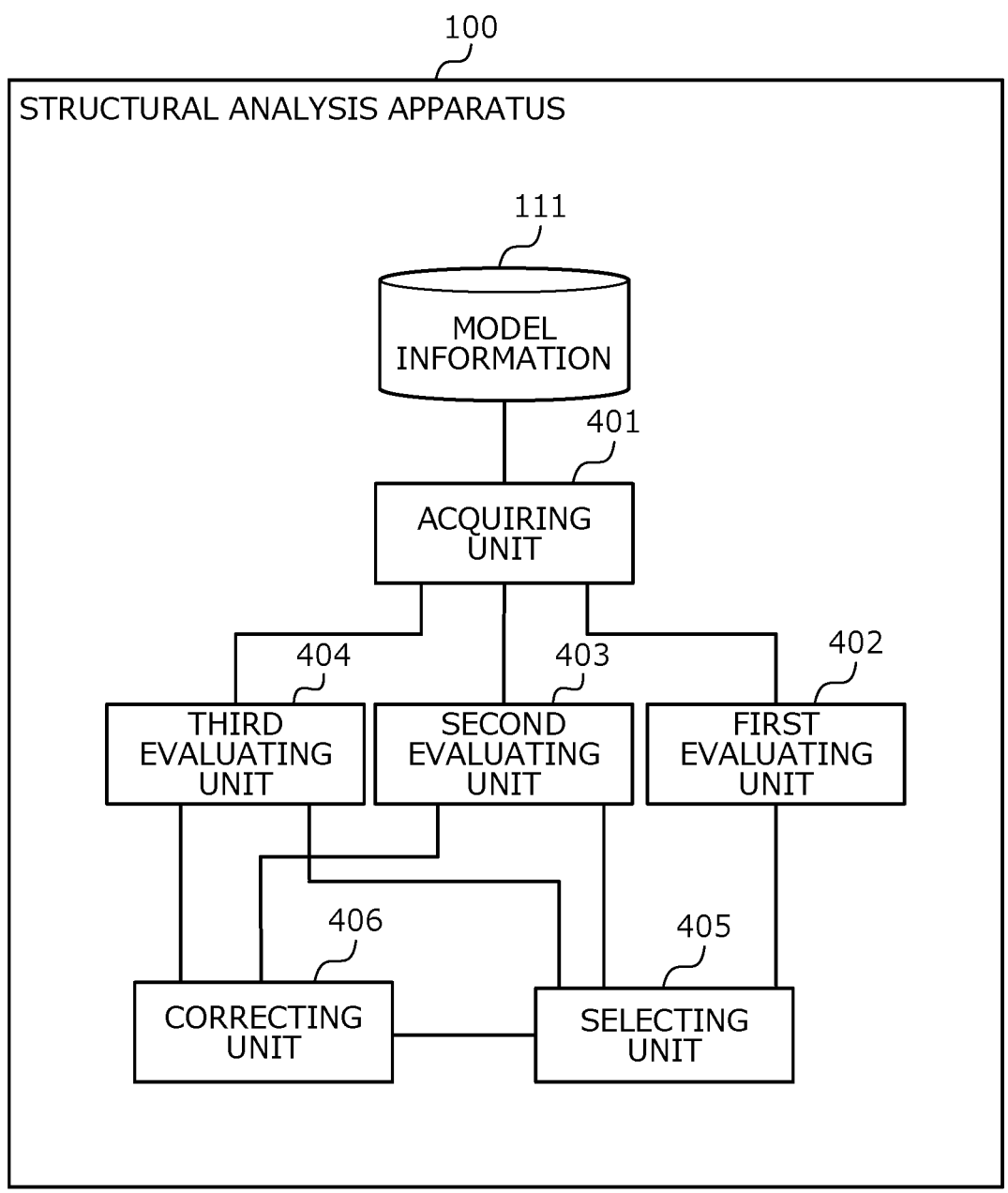
FIG. 4 is a block diagram of an example of a functional configuration of the structural analysis apparatus.

FIG. 4 is a block diagram of an example of a functional configuration of the structural analysis apparatus. The structural analysis apparatus 100 includes an acquiring unit 401, a first evaluating unit 402, a second evaluating unit 403, a third evaluating unit 404, a selecting unit 405, and a correcting unit 406. Processes executed by a control unit constituted by the units including the acquiring unit 401 to the correcting unit 406 are encoded in programs stored in a storage device such as, for example, the ROM 302, the RAM 303, or the disk 305 that is accessible by the CPU 301 depicted in FIG. 3. The CPU 301 reads the programs from the storage device and executes the processes encoded in the programs. The processes of the control unit are thereby realized. Results of processing by the control unit are stored to a storage device such as, for example, the RAM 303, the ROM 302, or the disk 305.

The acquiring unit 401 acquires the model information 111. The model information 111 is information that indicates the analysis model. The model information 111 includes, for example, information that indicates the shape of the model. Examples of the information indicating the shape of the model include element information regarding the elements included in the model, and information regarding the node points included in the elements and the positions of the node points. The information indicating the shape of the model may be information regarding, for example, the volume, the surface area, and the like. The model information 111 to be acquired may include, for example, information that indicates the material of the model. The model information 111 to be acquired may include, for example, information regarding a boundary condition set for the model for the analysis.

FIG. 5 is an explanatory diagram of an example of the model information. Reference characters A to C show element information regarding the elements included in the model, information regarding the node points included in the elements and the positions of the node points, and the like, as the model information. Reference character D show information indicating the shape of the model, information indicating the material of the model, information indicating the boundary condition set for the model for the analysis, and the like, as the model information 111. The boundary condition is a condition that is set for a boundary to represent a load state of the structure. For example, two types of boundary conditions are present that are a restraint condition and a loading condition. The restraint condition refers to conditions such as how to fix which part to the structure to be analyzed, how forcibly a displacement force is applied thereto, and the like. The loading condition refers to conditions such as to how large a force is applied to which part in which direction, and the like.

In the example depicted in FIG. 5 (reference character A), the model information 111 includes fields for a model ID and an element ID. The field for the model ID has identification information set therein identifying the model. The field for the element ID has identification information set therein identifying the element included in the analysis model. In the example depicted in FIG. 5 (reference character A), a model ma includes, for example, elements "en1" to "en3".

In the example depicted in FIG. 5 (reference character B), the model information 111 includes fields for the element ID and the node point ID. The field for the element ID has identification information set therein identifying the element. The field for the node point ID has identification information set therein identifying the node point included in the element. In the example depicted in FIG. 5 (reference character B), the element en1 includes node points "nn1" to "nn4".

In the example depicted in FIG. 5 (reference character C), the model information 111 includes fields for the node point ID and node point position information. The field for the node pint ID has identification information set therein identifying the node point. The field for the node point position information has position information regarding the node point set therein. The position information of the node point is, for example, coordinate values of the node point on the x-axis, the y-axis, and the z-axis.

The structural analysis apparatus 100 may identify the shape of the model based on the model information 111 depicted in FIG. 5 (reference characters A to C). For example, the structural analysis apparatus 100 may calculate the volume, the surface area, and the like of the model.

In the example depicted in FIG. 5 (reference character D), the model information 111 includes fields for the model ID, the volume, the mass, the principal moment of inertia, the number of node points, the element type, the mesh size, the number of elements, the number of degrees of analysis freedom, the volume of the smallest sphere, the surface area, the boundary condition, and the like. The field for the model ID has identification information set therein identifying the model. The field for the volume has the volume of the model set therein. The field for the mass has the mass of the model set therein. The field for the principal moment of inertia has the principal moment of inertial of the model set therein. The volume, the mass, and the principal moment of inertia are information determined by the material and the shape of the model.

The field for the element type has information set therein identifying the element type depicted in FIGS. 2A to 2C. The field for the number of degrees of analysis freedom has, for example a sum of the numbers of the degrees of freedom of the node points included in the model set therein. The final number of the degrees of analysis freedom is not determined when the construction of the simultaneous linear equations executed inside the solver of the CAE is not completed. An approximate value calculated according to, for example, "the number of node points×the number of degrees of freedom per one node point may be set as the number of degrees of analysis freedom.

The field for the mesh size has the element length of the typical one element set therein that is acquired when the mesh division is executed. For a plate element or a rafter element, information regarding the cross-section property such as the plate thickness and the cross-sectional area may be set concurrently.

The field for the number of node points has the number of the node points included in the model set therein. The field for the number of elements has the number of the elements included in the model set therein. For the number of elements, a predictive value may be calculated based on the mesh size, the volume of the shape, and the element type. For the number of the node points, a predictive value may be calculated based on the number of elements, the element type, and the degree of agglomeration. When the model information 111 depicted in FIG. 5 (reference characters A to C) is already present, the number of elements and the number of node points may be identified based on the model information 111.

The field for the volume of the smallest sphere has the volume of the smallest sphere set therein that covers the model. The field for the volume of the smallest sphere is present in this example although the field is not limited to this and, for example, a field may be present for the volume of the smallest cube that covers the model. The volume of the sphere or the volume of the cube is used in the calculation of the degree of agglomeration in the determination method 1 described later.

The field for the surface area has the surface area of the model set therein. The field for the boundary condition includes fields for, for example, the restraint condition, the restraint area, and the loading condition. The field for the constraint condition has, for example, the constraint condition set therein. Examples of the restraint condition include, for example, attachment at one end, attachment at both ends, and attachment around entire perimeter. The field for the restraint area has set therein, the area of the surface area of the model, the area that is constrained by the restraint condition. The field for the number of degrees of constraint freedom has set therein, for example, the number of the degrees of constraint freedom, of the number of degrees of freedom per one node point. For example, when the degree of freedom per one node point is three directions, the number of degrees of constraint freedom indicates how many directions are constrained of the three directions. The field for the loading condition has the loading condition set therein. Examples of the loading condition include, for example, gravitational loading in each of the directions.

The first evaluating unit 402 depicted in FIG. 4 evaluates the degree of agglomeration of the analysis model, based on the model information 111 acquired by the acquiring unit 401. The selecting unit 405 selects based on the result of the evaluation of the degree of agglomeration of the model, the direct method or the iterative method as the algorithm for the solving the simultaneous linear equations, the algorithm being for the structural analysis solver that uses the finite element method of the model.

In the present embodiment, the determination methods 1 to 5 will be taken as examples for the evaluation of the degree of agglomeration and the determination by the degree of agglomeration.

In the determination method 1, the first evaluating unit 402 calculates the degree of filling of the analysis model relative to a space, as the degree of agglomeration. For example, the first evaluating unit 402 calculates, for example, the ratio of the volume of the analysis model and the volume of the smallest three-dimensional solid of a specific type that covers the model, as the degree of agglomeration. The three-dimensional solid of the specific type in this case is a three-dimensional solid that is usable for the filling. The filling refers to space filling or sphere filling. Examples of the three-dimensional solid usable for the filling include, for example, a sphere, a cube, and a rhombic dodecahedron. In this example, the sphere will be taken as an example. The first evaluating unit 402 calculates, for example, the ratio of the volume of the model and the volume of the smallest sphere that covers the model, as the degree of agglomeration. The first evaluating unit 402 calculates the degree of agglomeration based on, for example, equation (1) below.

$$\text{degree of agglomeration} = \text{volume of model/volume of smallest sphere covering model} \quad (1)$$

With the determination method 1, the solution method may be selected and the solution method may be determined easily even in a pre-stage of executing mesh division using the preprocessor of the CAE.

In the determination method 2, the first evaluating unit 402 calculates an index that indicates whether the analysis model is heavy, as the degree of agglomeration. For example, the first evaluating unit 402 calculates the degree of agglomeration based on, for example, the principal moment of inertia, the mass, and the volume of the analysis model using the moment of inertia. The first evaluating unit 402 calculates the degree of agglomeration based on, for example, equation (2) below.

$$\text{degree of agglomeration} = 1/((I_x \times I_y \times I_z)/(M^3)/(V^2)) \quad (2)$$

Where, Ix, Iy, and Iz are the principal moments of inertia of the model, M is the mass of the model, and V is the volume of the model.

With the determination method 2, the solution method may be selected and the solution method may be determined easily even in the pre-stage of executing the mesh division using the preprocessor of the CAE.

In the determination method 3, the first evaluating unit 402 calculates the ratio of the number of all the elements of the analysis model and the number of all the node points of the analysis model, as the degree of agglomeration. For example, the first evaluating unit 402 calculates the degree of agglomeration according to equation (3) below.

$$\text{degree of agglomeration} = \text{number of all elements/number of all node points} \quad (3)$$

Because a node point is shared among plural elements, the number of the node points in the overall model is smaller than "the number of elements×the number of node points per one element". For example, when the analysis model is a plate-rafter-like article, many of the node points are present on the surface of the analysis model and the possibility is therefore low for the number of the node points to be shared among the plural elements. In contrast, when the analysis model is an agglomeration-like article, the possibility is high for the node points to be shared inside. Therefore, the possibility that the analysis model is an agglomeration-like article increases as the value of "the number of all the elements/the number of all the node points" increases. On the other hand, the possibility for the analysis model to be a plate-rafter-like article increases as the value of "the number of all the elements/the number of all the node points" decreases. When the degree of agglomeration is high, the number of shared node points is relatively high and the non-zero areas in the coefficient matrix and the triangular matrix of the simultaneous linear equations increase. The analysis time period is therefore longer for the direct method. Reduction of the analysis time period may therefore be facilitated by selecting the iterative method when the degree of agglomeration is high. When the iterative method is selected for a plate-rafter-like article, the convergence is slow and the analysis time period is long. When the degree of agglomeration is low, reduction of the analysis time period may be facilitated by selecting the direct method.

In the determination method 4, the first evaluating unit 402 calculates an index value based on the number of degrees of analysis freedom of the analysis model, as the degree of agglomeration. For example, the first evaluating unit 402 calculates the ratio of the sum of the numbers of the degrees of analysis freedom for each of the elements in the overall model, and the number of the degrees of analysis freedom in the overall model, as the degree of agglomeration. The first evaluating unit 402 calculates the degree of agglomeration according to, for example, equation (4) below.

degree of agglomeration=sum of number of degrees of analysis freedom for each of the elements in the overall model/number of degrees of analysis freedom in the overall model (4)

The sum of the numbers of the degrees of analysis freedom for each of the elements in the overall model is the total value of the numbers of the degrees of analysis freedom per one element. For example, the sum of the numbers of the degrees of analysis freedom for each of the elements in the overall model is "the number of the elements×the number of the node points per one element×the number of the degrees of freedom per one node point". The number of the degrees of analysis freedom in the overall model is the number of the dimensions of the simultaneous linear equations and, when this number is unknown, may be calculated according to "the number of the node points in the overall model×the number of the degrees of freedom per one node point−the number of the degrees of constraint freedom in the overall model".

An example will be taken where the number of the elements is 5,000, the number of the node points per one element is 10, the number of the node points is 8,000, and the number of the degrees of freedom per one node point is 3. The sum of the numbers of the degrees of analysis freedom for each of the elements in the overall model is 5,000×10×3. In contrast, ignoring the number of the degrees of constraint freedom in the overall model, the number of the degrees of analysis freedom in the overall model is 8,000×3. The degree of agglomeration is 150,000/24,000.

As described above, a node point is shared among plural elements and the number of the node points in the overall model is therefore smaller than "the number of the elements×the number of the node points per one element". When the analysis model is an agglomeration-like article, the possibility is high for the node points each to be shared among plural elements. In contrast, when the analysis model is a plate-rafter-like article, the possibility is high for the node points to be present on the surface, and the number of the node points each shared among plural elements is relatively smaller than that of the agglomeration-like article. When the degree of agglomeration is high, the number of the node points to be shared increases relatively and the non-zero areas in the coefficient matrix and the triangular matrix of the simultaneous linear equations increase. The analysis time period with the direct method is therefore increased. Reduction of the analysis time period may therefore be facilitated by selecting the iterative method when the degree of agglomeration is high. When the iterative method is selected for the plate-rafter-like article, the convergence is slow and the analysis time period is long. When the degree of agglomeration is low, reduction of the analysis time period may be facilitated by selecting the direct method.

According to the determination method 4, a comparison of the degree of agglomeration may be executed even between the models whose element types are different from each other. Determination may therefore be executed using an equal threshold value even when the element types are different from each other, and the selection of the solution method may be executed easily.

In the determination method 5, the first evaluating unit 402 calculates the degree of agglomeration based on the number of the node points on the surface of the analysis model. For example, the first evaluating unit 402 calculates, for example, the ratio of the number of the node points in the overall model and the number of the node points on the surface of the model, as the degree of agglomeration. In the determination method 5, the first evaluating unit 402 may calculate the ratio of the number of the node points present inside the model and the number of the node points present on the surface of the model, as the degree of agglomeration. In the determination method 5, the first evaluating unit 402 may calculate the ratio of the number of the node points present inside the model and the number of the node points in the overall model, as the degree of agglomeration. The number of the node points present inside the model refers to the number of the node points other than the node points present on the surface of the model. The first evaluating unit 402 calculates the degree of agglomeration according to, for example, equation (5) below.

degree of agglomeration=number of node points in the overall model/number of node points on the surface of the model (5)

The first evaluating unit 402 may identify whether the node points included in the model are each a node point present inside the model or a node point present on the surface thereof, based on the model information 111 depicted in FIG. 5 (reference characters A to C and the like).

As described above, when the shape type of the model is the agglomeration-like article, the number of the node points each shared inside the model is large and the number of the node points on the surface of the model is relatively small. According to equation (5), when the number of the node points on the surface of the model is small relative to the number of the node points in the overall model, the degree of agglomeration is therefore high and the possibility is high for the model to be a lump-type article. In contrast, when the shape type of the model is the plate-rafter-like article, the number of the node points each shared inside the model is small and the number of the node points on the surface of the model is therefore relatively large. When the number of the node points on the surface of the model is large relative to the number of the node points in the overall model, the degree of agglomeration is therefore low and the possibility is high for the model to be a plate-rafter-type article.

When the finite element method is used, the analysis model is produced for the finite element method. The number of the elements and the number of the node points may be identified easily by referring to the model information 111 and, according to the determination methods 3 to 5, the solution method can easily be selected.

The selecting unit 405 selects based on the result of the evaluation of the degree of agglomeration of the model, the direct method or the iterative method as the algorithm for solving the simultaneous linear equations, the algorithm being for the structural analysis solver that uses the finite element method of the model. For example, the selecting unit 405 more strongly tends to select the iterative method as the degree of agglomeration becomes higher. For example, the selecting unit 405 selects the direct method or the iterative method depending on whether the degree of agglomeration is at least a threshold value. For example, the selecting unit 405 selects the iterative method when the degree of agglomeration is equal to the threshold value or higher, and selects the direct method when the degree of agglomeration is lower than the threshold value. The iterative method more strongly tends to be selected as the degree of agglomeration is higher. The threshold value is set in advance and is stored in a storage device such as the ROM 302, the RAM 303, or the disk 305.

Before a detailed description of an example of selection by the selecting unit 405, a method of setting the threshold value for the selection by the selecting unit 405 will be described. While this description will be made assuming that the structural analysis apparatus 100 executes the method of setting the threshold value, the procedure is not limited to this and, for example, an apparatus different from the structural analysis apparatus 100 may determine the threshold value and may present the threshold value to the structural analysis apparatus 100.

The structural analysis apparatus 100 calculates, for example, the degree of agglomeration for each of plural models. The structural analysis apparatus 100 executes a numerical analysis using the direct method and the iterative method for each of the plural models. The structural analysis apparatus 100 determines the degree of agglomeration by which the performance ratio of the analysis time period based on the direct method and the analysis time period based on the iterative method becomes 1, using the linear interpolation, and employs the determined value as the threshold value.

FIG. 6 is an explanatory diagram of an example of the model used for the derivation of the threshold value. The derivation of the threshold value will be described taking examples of models "m1" to "m4". The dimensions of the model m1 are, for example, 10×100×1,000 and the shape type thereof is the plate-rafter-like article. The dimensions of the model m2 are, for example, 50×100×1,000 and the shape type thereof is the plate-rafter-like article. The dimensions of the model m3 are, for example, 50×100×200 and the shape type is the agglomeration-like article. The dimensions of the model m4 are, for example, 250×500×1,000 and the shape type thereof is the agglomeration-like article.

In the present embodiment, an example will be described where the threshold value is set based on the degree of agglomeration and the analysis time period for each of the determination methods, for a case where the mesh division is executed for each of the models m1 to m4 such that the number of the elements is about 5,000 and for a case where the mesh division is executed therefor such that the number of the elements is about 10,000.

FIG. 7 is an explanatory diagram of an example of the derivation of the threshold value for the case where the number of the elements is 5,000. In FIG. 7, (1) to (11) depict the values used in the determination method and (12) and (13) depict the analysis time periods used therein.

For example, described above, the structural analysis apparatus 100 first determines the degree of agglomeration based on "the volume of the model/the volume of the smallest sphere covering the model" using the determination method 1. The volume of the model is depicted at (1) and the volume of the smallest sphere covering the model is depicted at (6).

For example, the degree of agglomeration of the model m1 using the determination method 1 is "1.00E+06/5.32E+08" and thereby is "1.88E–003".

For example, described above, the structural analysis apparatus 100 determines the degree of agglomeration based on "(the principal moment of inertia Ix×the principal moment of inertia Iy×the principal moment of inertia Iz)/ (the mass^3)/(the volume of the model^2)" using the determination method 2. The principal moment of inertia Ix is depicted at (3), the principal moment of inertia Iy is depicted at (4), and the principal moment of inertia Iz is depicted at (5). The mass is depicted at (2).

For example, the degree of agglomeration of the model m1 using the determination method 2 is "1/((6.54$E$+05×6.61$E$+05×6.61$E$+03)/7.85^3/1.00$E$+06)" and thereby is "1.69$E$-01".

For example, described above, the structural analysis apparatus 100 determines the degree of agglomeration based on "the number of the elements of the model/the number of the node points of the model" using the determination method 3. The number of the elements of the model is depicted at (8) and the number of the node points of the model is depicted at (7).

For example, the degree of agglomeration of the model m1 using the determination method 3 is "4,660/8,693" and thereby is "5.36E–001".

For example, described above, the structural analysis apparatus 100 determines the degree of agglomeration based on "the sum of the numbers of the degrees of analysis freedom for each of the elements/the number of the degrees of analysis freedom" using the determination method 4. The sum of the numbers of the degrees of analysis freedom for each of the elements is depicted at (10). The number of the degrees of analysis freedom is depicted at (9).

For example, the degree of agglomeration of the model m1 using the determination method 4 is "(4,660×3×10)/25,944" and thereby is "5.39". As described above, the sum of the numbers of the degrees of analysis freedom for each of the elements is "the number of the elements×the number of degrees of freedom per one node point×the number of the node points per one element", therefore is "4,660×3×10", and thereby is "139,800". The element type is a secondary element that is a tetrahedron.

For example, described above, the structural analysis apparatus 100 determines the degree of agglomeration based on "the number of the node points in the overall model/the number of the node points on the surface of the model" using the determination method 5. The number of the node points in the overall model is depicted at (7). The number of the node points on the surface of the model is depicted at (11).

For example, the degree of agglomeration of the model m1 using the determination method 5 is "8,693/4,730" and thereby is "1.84". The degree of agglomeration is similarly determined using each of the determination methods 1 to 5 for each of the models m2 to m4.

The structural analysis apparatus 100 determines the analysis time period by, for example, executing the numerical analysis using the direct method and the numerical analysis using the iterative method for each of the models m1 to m4. The structural analysis apparatus 100 determines the ratio of the analysis time period based on the direct method and the analysis time period based on the iterative method, as the performance ratio.

In the example depicted in FIG. 7, a performance ratio of 1 is present between the performance ratio of the model m2 and the performance ratio of the model m3. The structural analysis apparatus 100 determines the degree of agglomeration in the case where the performance ratio is 1, by linear-interpolating the degree of agglomeration of the model m2 and the degree of agglomeration of the model m3. The structural analysis apparatus 100 sets the degree of agglomeration in the case where the performance ratio is 1, to be the threshold value. The degree of agglomeration may be determined using, for example, Lagrange interpolation, spline interpolation, or a least-square method, without limitation to the linear interpolation.

An example will be described below where the threshold value for the determination method 1 is determined by the linear interpolation.

threshold value=degree of agglomeration of model $m2$+(degree of agglomeration of model $m3$−degree of agglomeration of model $m2$)×((1−performance ratio of model 2)/(performance ratio of model 3−performance ratio of model 2))= (9.37$E$−003)+((1.59$E$−001)−(9.37$E$−003))×((1−0.24)/(1.49−0.24))=1.00$E$−001

In this manner, the threshold value for each of the determination methods may be determined. As indicated by the performance ratio, for the model m2, the analysis time period based on the direct method is shorter than the analysis time period based on the iterative method. In contrast, for the model m3, the analysis time period based on the iterative method is shorter than the analysis time period based on the direct method. The degree of agglomeration of the model m2 is lower than the degree of agglomeration of the model m3. Reduction of the analysis time period may be facilitated by the fact that the selecting unit 405 selects the iterative method when the degree of agglomeration calculated by the first evaluating unit 402 is equal to the threshold value or higher and selects the direct method when the degree of agglomeration is lower than the threshold value described above.

FIG. 8 is an explanatory diagram of an example of the derivation of the threshold value for a case where the number of elements is 10,000. No detailed description will be made with reference to FIG. 8 because FIG. 8 depicts the example of determining the threshold value in the same manner as that of FIG. 7.

Similar to the example depicted in FIG. 7, the performance ratio of 1 is present between the performance ratio of the model m2 and the performance ratio of the model m3 in FIG. 8 and the structural analysis apparatus 100 therefore determines the degree of agglomeration in the case where the performance ratio is 1, by linear-interpolating the degree of agglomeration of the model m2 and the degree of agglomeration of the model m3, as the threshold value. Similar to the example depicted in FIG. 7, in the example depicted in FIG. 8, for the model m2, the analysis time period based on the direct method is shorter than the analysis time period based on the iterative method. In contrast, for the model m3 whose degree of agglomeration is higher than that of the model m2, the analysis time period based on the iterative method is shorter than the analysis time period based on the direct method. Reduction of the analysis time period may be facilitated by the fact that the selecting unit 405 selects the iterative method when the degree of agglomeration calculated by the first evaluating unit 402 is equal to the threshold value or higher and selects the direct method when the degree of agglomeration is lower than the threshold value described above.

As described above, the selecting unit 405 depicted in FIG. 5 compares the degree of agglomeration calculated by the first evaluating unit 402 with the acquired threshold value. The selecting unit 405 selects the iterative method when the degree of agglomeration is equal to the threshold value or higher and selects the direct method when the degree of agglomeration is lower than the threshold value.

When the selecting unit 405 selects the direct method or the iterative method as the algorithm of solving the simultaneous linear equations based on the result of the evaluation of the degree of agglomeration of the model, the selecting unit 405 reflects on the selection, the strictness of the boundary condition of the model and/or the model scale of the model.

When the selecting unit 405 selects the direct method or the iterative method as the algorithm of the structural analysis using the FEM based on the result of the evaluation of the degree of agglomeration of the model, the selecting unit 405 changes the selection criterion for the algorithm corresponding to the degree of agglomeration based on the strictness of the boundary condition of the model and/or the model scale of the model.

In this manner, when the direct method or the iterative method is selected, the threshold value to be the selection criterion for the algorithm may be corrected or the degree of agglomeration may be corrected to reflect on the selection, the strength of the boundary condition of the model and/or the model scale of the model.

The model scale will first be described and the strength of the boundary condition of the model will be described later.

When the model scale of the model 101 to be analyzed is large, the number of the node points 103 to be analyzed is large and the memory use capacity therefore increases. The selecting unit 405 therefore reflects the model scale of the model on the selection when the selecting unit 405 selects the direct method or the iterative method as the algorithm based on the degree of agglomeration. The model scale of the model may be, for example, the number of the elements, the number of the node points, or the number of the degrees of analysis freedom described above. When the selecting unit 405 selects the direct method or the iterative method as the algorithm based on the degree of agglomeration, the selecting unit 405 may reflect on the selection, the evaluated model scale and the memory use capacity available for the analysis.

For example, the structural analysis apparatus 100 selects the direct method in a case, for example, where the memory capacity used when the model scale of the model 101 is analyzed using the direct method is smaller than the memory use capacity available for the analysis. On the other hand, the structural analysis apparatus 100 selects the iterative method in a case, for example, where the memory capacity used when the model scale of the model 101 is analyzed using the direct method is equal to or larger than the memory use capacity available for the analysis.

For example, for the memory capacity used when the model is analyzed, an estimated value thereof may be calculated based on the model scale that is calculated from the element type, the number of the elements, the number of the node points, and the like. For example, an item may be prepared in advance in the storage device or the like as to what size of memory capacity is used for each one element when the direct method is used. The structural analysis apparatus 100 may calculate the memory capacity to be used, corresponding to the number of the elements of the model 101 to be analyzed.

For example, because the analysis based on the direct method is generally more precise than the analysis based on the iterative method, the direct method may be desired to be used to improve the precision when it is known that the analysis based on the direct method does not need a long time period. With the analysis based on the direct method, however, as described above, the analysis takes a long time when the memory use capacity is insufficient. The memory use capacity may be estimated based on the model scale by selecting the analysis method according to the model scale, and reduction of the analysis time period may therefore be facilitated, thereby facilitating improvement of the precision by executing the analysis based on the direct method without the memory being insufficient.

For example, when the selecting unit 405 selects the direct method or the iterative method as the algorithm for solving the simultaneous linear equations of the structural analysis solver that uses the FEM, the selecting unit 405 more strongly tends to select the iterative method as the model scale of the model increases.

The second evaluating unit 403 executes the evaluation of the model scale based on, for example, the number of the elements and/or the number of the node points and/or the number of the degrees of analysis freedom that are calculated from the model information 111 and the mesh size. For example, when the model information 111 includes information that indicates the shape of the model such as, for example, the volume of the model, the second evaluating unit 403 calculates the number of the elements based on the volume, the mesh size, and the element type of the model. The number of the elements calculated in this case is a predictive value. The second evaluating unit 403 calculates the number of the node points based on, for example, the number of the elements, the element type, and the degree of agglomeration of the model. The number of the node points calculated in this case is a predictive value. The second evaluating unit 403 calculates the number of the degrees of analysis freedom based on, for example, the number of the node points, the element type, and the restraint condition of the model. The number of the degrees of analysis freedom calculated in this case is a predictive value.

As depicted in FIG. 5 (reference characters A to C), when the model information 111 includes information regarding the elements, the node points, and the number of the degrees of analysis freedom, and the like, the second evaluating unit 403 may identify the number of the elements, the number of the node points, and the number of the degrees of analysis freedom from the model information 111.

For example, the selecting unit 405 more strongly tends to select the iterative method as the model scale increases. For example, the selecting unit 405 acquires the threshold value corresponding to the model scale of the model and selects the solution method from the iterative method and the direct method based on the acquired threshold value.

FIG. 9 is an explanatory diagram of an example of the threshold value that corresponds to the model scale. A threshold value table 900 includes, for example, the threshold value for each of the determination methods and each of the numbers of the elements. The determination methods are, for example, the above determination methods 1 to 5. In FIG. 9, while the number of the elements is taken as an example of the evaluation for the model scale, the evaluation is not limited to this and may be the number of the node points and the number of the degrees of analysis freedom.

In the example of the threshold table 900, the numbers of the elements are, for example, 3,000, 5,000, 7,000, and 10,000. Taking an example of the determination method 1, the threshold values are "threshold value th11 corresponding to the number of elements of 3,000>threshold value th12 corresponding to the number of elements of 5,000>threshold value th13 corresponding to the number of elements of 7,000>threshold value th14 corresponding to the number of elements of 10,000. In this manner, the threshold value becomes greater as the number of the elements becomes smaller. The iterative method thereby more strongly tends to be selected as the number of the elements becomes greater because the threshold value becomes smaller as the number of the elements becomes greater. In a case where the model scale is large, when the direct method is used, a large memory use capacity is necessary for the analysis, the memory use capacity is insufficient, and the analysis takes a long time. The insufficiency of the memory for the analysis may therefore be avoided and reduction of the analysis time period may be facilitated because the iterative method is selected when the model scale is large.

The selecting unit 405 acquires from the threshold value table 900, the threshold value that corresponds to the number of the elements and compares the calculated degree of agglomeration and the acquired threshold value. For example, the selecting unit 405 acquires the threshold value that corresponds to the number of elements being 3,000 when the number of the elements of the analysis model is, for example, equal to 4,000 or smaller. For example, the selecting unit 405 acquires the threshold value that corresponds to the number of elements being 5,000 when the number of the elements of the analysis model is, for example, from 4,000 to 7,000. In this manner, a range of the number of elements may be set. The selecting unit 405 selects the iterative method when the calculated degree of agglomeration is equal to the acquired threshold value or higher, and selects the direct method when the calculated degree of agglomeration is lower than the acquired threshold value.

In the examples depicted in FIGS. 7 and 8, for the determination methods 3 to 5, the threshold value for the number of elements being 10,000 is smaller than that for the number of elements being 5,000. This is because the element division is executed for the same one model with a smaller mesh size for the case of the number of elements being 10,000 than that for the case of the number of elements being 5,000 and the degree of the agglomeration itself of the model therefore becomes high.

The correcting unit 406 may calculate the threshold value that corresponds to the number of the elements of the analysis model, by executing linear interpolation for the threshold values each corresponding to a number of elements included in the threshold value table 900. When the number of elements of the analysis model is 7,500, the correcting unit 406 may determine the threshold value that corresponds to the number of elements of 7,500 by linear-interpolating the threshold value corresponding to the number of elements of 7,000 and the threshold value corresponding to the number of elements of 10,000. When many sampling points are present for the threshold value, the correcting unit 406 may determine the threshold value that corresponds to the number of elements of the analysis model using the Lagrange interpolation, the spline interpolation, the least-square method, or the like.

The iterative method is thereby selected when the model scale is a large scale in a case where the algorithm is selected based on the evaluation of the degree of agglomeration.

FIG. 10 is an explanatory diagram of an example of the calculation of the degree of agglomeration and an example of the selection of the solution method. The analysis model has dimensions of, for example, 50×100×500. The shape type thereof is unknown.

The first evaluating unit 402 calculates the degree of agglomeration for, for example, at least any one of the determination methods 1 to 5. The detailed calculation method is described above and will not again be described. In the example depicted in FIG. 10, the first evaluating unit 402 calculates the degree of agglomeration for each of all the determination methods 1 to 5.

The second evaluating unit 403 evaluates the model scale of the analysis model based on, for example, the number of the elements and/or the number of the node points and/or the number of the degrees of analysis freedom of the analysis model. An index value of the model scale may be, for example, the number itself of elements or the number of node points. The index value of the model scale may be, for example, the number of degrees of the analysis freedom.

The selecting unit 405 acquires from the threshold value table 900, the threshold value corresponding to, for example, the evaluated model scale. In the example depicted in FIG. 10, because the number of the elements is 4,724, the selecting unit 405 acquires for each of the determination methods, the threshold value that corresponds to the number of elements being 5,000, the selecting unit 405 acquiring the threshold values from the threshold value table 900. The example depicted in FIG. 7 is used as the threshold value for each of the determination methods, in a case where the number of elements is 5,000.

In the example depicted in FIG. 10, for the determination method 1, the degree of agglomeration is "3.55E−002"<the threshold value "1.00E−001" and the selecting unit 405 therefore selects the direct method.

In the example depicted in FIG. 10, for the determination method 2, the degree of agglomeration is "1.32E+01"<the threshold value "4.08E+01" and the selecting unit 405 therefore selects the direct method.

In the example depicted in FIG. 10, for the determination method 3, the degree of agglomeration is "5.99E−01" <the threshold value "6.04E−01" and the selecting unit 405 therefore selects the direct method.

In the example depicted in FIG. 10, for the determination method 4, the degree of agglomeration is "6.17"<the threshold value "6.18" and the selecting unit 405 therefore selects the direct method.

In the example depicted in FIG. 10, for the determination method 5, the degree of agglomeration is "2.49"<the threshold value "2.64" and the selecting unit 405 therefore selects the direct method.

In the example depicted in FIG. 10, the direct method is selected for each of the determination methods and the selecting unit 405 therefore selects the direct method and executes the numerical analysis.

The strength of the boundary condition will be described. As described with reference to the model information 111 depicted in FIG. 5, the types of boundary condition include the constraint condition and the loading condition. The strength of the boundary condition may be, for example, either the strength of the constraint condition or the weakness of the loading condition, or may be evaluated based on the strength of the constraint condition and the weakness of the loading condition.

The constraint condition has the type and the direction of the constraint, the position and the area to be constrained, and the like set therein. The strength of the constraint condition is, for example, the strength with which the analysis model is constrained according to the constraint condition. The strength of the constraint condition is evaluated based on the area that corresponds to the range constrained by the constraint condition, of the surface of the analysis model as described later. The loading condition has the type of the loading, the magnitude and the direction of the loading, the position or the area to which the loading is applied, and the like set therein. The weakness of the loading condition is, for example, an inverse of the magnitude of the influence exerted by the loading condition on stiffness. The weakness of the loading condition is evaluated based on, for example, the inverse of the magnitude of the influence exerted by the loading condition on stiffness.

Description will be made taking an example of the constraint condition. When the selecting unit 405 selects the direct method or the iterative method as the algorithm for solving the simultaneous linear equations based on the result of the evaluation of the degree of agglomeration of the model, the selecting unit 405 reflects the strength of the constraint condition of the model, on the selection. For example, the third evaluating unit 404 calculates the strength of the constraint condition based on the constraint area and the degree of constraint freedom of the model. As described above, the constraint area is the area of a portion to be constrained in the model according to the constraint condition. As described above, the number of degrees of constraint freedom is the number of degrees of freedom to be constrained, of the number of degrees of freedom per one node point. For example, the third evaluating unit 404 calculates the strength of the constraint condition according to equation (6) below.

strength of constraint condition=constraint area/surface area×(number of degrees of constraint freedom per one node point/number of degrees of freedom per one node point) (6)

When plural constraint conditions are set for the model, the sum of these strengths is the strength of the constraint conditions for the overall model.

The selecting unit 405 selects the algorithm based on the degree of agglomeration that is corrected based on the strength of the constraint condition calculated by the third evaluating unit 404.

For example, when the selecting unit 405 selects the direct method or the iterative method as the algorithm based on the result of the evaluation of the model, the selecting unit 405 changes the selection criterion for the algorithm according to the degree of agglomeration determined by the evaluation, based on the strength of the constraint condition of the model. For example, the selecting unit 405 employs the threshold value corrected based on the strength of the constraint condition of the model, as the new selection criterion.

For example, when the selecting unit 405 selects the direct method or the iterative method as the algorithm based on the result of the evaluation of the model, the selecting unit 405 more strongly tends to select the direct method as the strength of the constraint condition of the model decreases. Traditionally, when the constraint condition of the model is insufficient, problems arise in that no convergence is achieved using the iterative method to acquire no solution and a long time period is necessary for the analysis. For such a model, the solution may be determined relatively stably and reduction of the analysis time period may be facilitated by using the direct method. In contrast, when the constraint condition of the model is strong, reduction of the analysis time period may be facilitated by using the iterative method.

An example will be described where the threshold value is corrected based on the strength of the constraint condition of the model. To correct the threshold value based on the strength of the constraint condition, the structural analysis apparatus 100 first determines the threshold value for the degree of agglomeration using the models whose strengths of their constraint conditions are different from each other. The correcting unit 406 corrects the threshold value based on the strength of the constraint condition of the analysis model and the threshold value determined using the models whose strengths of their constraint conditions are different from each other. In this case, the process of determining the threshold value for the degree of agglomeration using the models whose strengths of their constraint conditions are different from each other may be executed by an apparatus different from the structural analysis apparatus 100.

Figure 11:
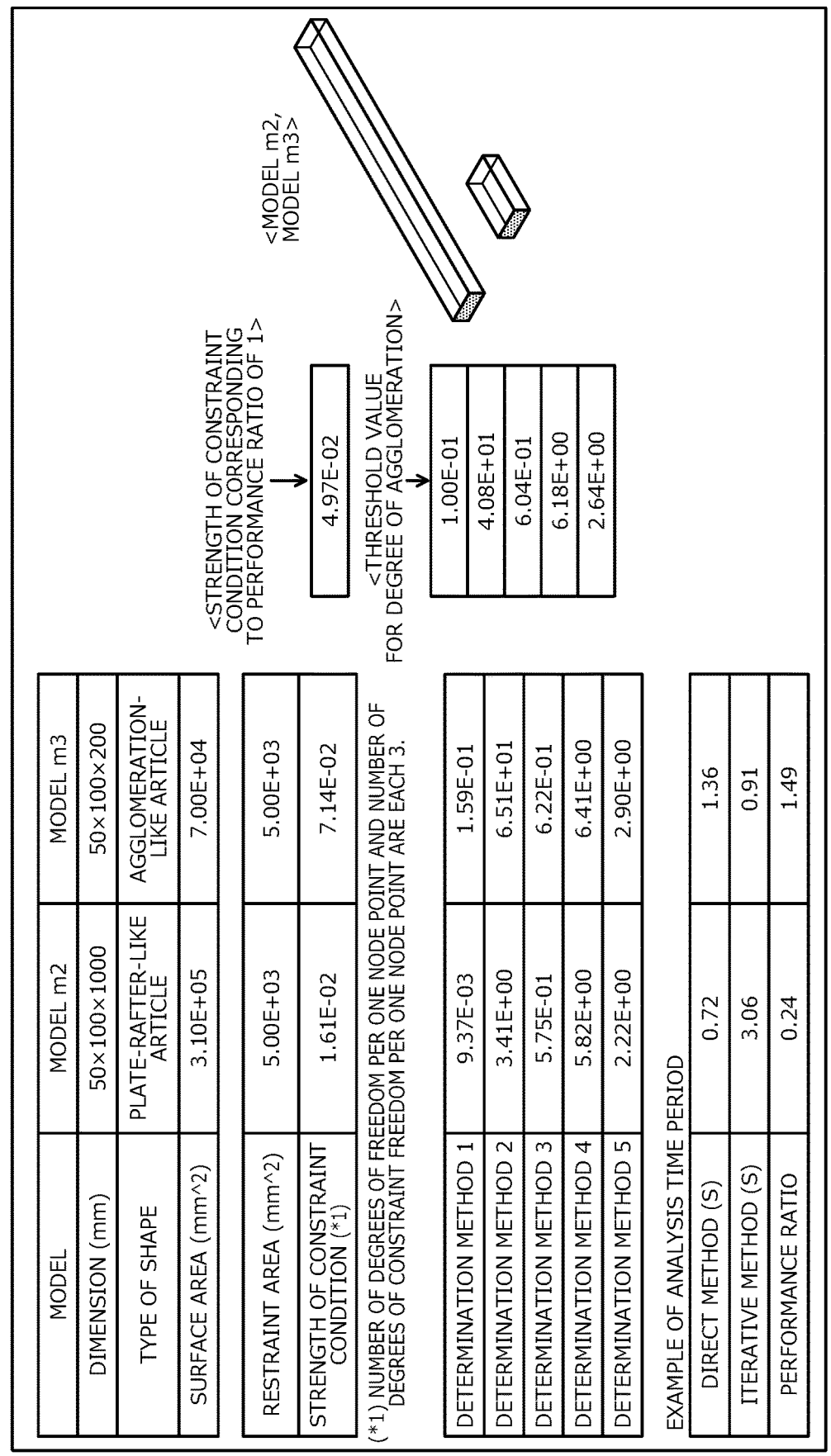
FIG. 11 is an explanatory diagram of an example of derivation of the threshold value for the degree of agglomeration in a case where a constraint condition is that of an attachment at one end type.

FIG. 11 is an explanatory diagram of an example of derivation of the threshold value for the degree of agglomeration in a case where the constraint condition is that of an attachment at one end type. FIG. 11 depicts an example where the threshold value for the degree of agglomeration is determined using the degree of agglomeration and the analysis time period of the case where the constraint condition is that of the attachment at one end type for each of the models m2 and m3 depicted in FIG. 6. An example of a case for 5,000 elements will be taken as an example for each of the models m2 and m3. A hatched portion of each of the models m2 and m3 is the portion to be constrained.

The example of the calculation of the degree of agglomeration of each of the models m2 and m3 for each of the determination methods 1 to 5 is as depicted in FIG. 8.

The structural analysis apparatus 100 calculates the strength of the constraint condition for each of the models m2 and m3 based on equation (6). The number of degrees of the constraint freedom per one node point and the number of degrees of freedom per one node point are each 3 and will not again be described.

The constraint condition is that of the attachment at one end type and the dimensions of the model m2 are "50×100× 1,000". The constraint area of the model m2 is therefore "50×100" and is thereby "5.00E+03". The constraint condition is that of the attachment at one end type and the dimensions of the model m3 are "50×100×200". The constraint area of the model m3 is therefore "50×100" and is thereby "5.00E+03".

The strength of the constraint condition of the model m2 is "(5.00E+03)/(3.10E+05)" and thereby is "1.61E−02". The strength of the constraint condition of the model m3 is "(5.00E+03)/(3.10E+05)" and thereby is "1.61E−02".

The structural analysis apparatus 100 determines the analysis time period by executing the numerical analysis using each of the direct method and the iterative method for each of the models m2 and m3. The structural analysis apparatus 100 calculates the performance ratio of the analysis time period based on the direct method and the analysis time period based on the iterative method.

The performance ratio of the model m2 is "0.24" and the performance ratio of the model m3 is "1.49".

The structural analysis apparatus 100 determines the degree of agglomeration by linear interpolation in each of the determination methods 1 to 5 for the case where the performance ratio of the analysis time period based on the direct method and the analysis time period based on the iterative method is 1, and employs this degree of agglomeration as the threshold value. The structural analysis apparatus 100 determines the strength of the constraint condition that corresponds to the threshold value for this degree of agglomeration. For example, the structural analysis apparatus 100 calculates the strength of the constraint condition in the case where the performance ratio is 1 using the linear interpolation based on the strengths of the constraint conditions of the models m2 and m3, and the performance ratios of the models m2 and m3. The Lagrange interpolation, the spline interpolation, or the least-square method may be used instead of the linear interpolation.

The strength of the constraint condition in the case where the performance ratio is 1=strength of the constraint condition of model m2+(strength of the constraint condition of model m3−strength of the constraint condition of model m2)×((1−performance ratio of model m2)/(performance ratio of model m3−performance ratio of model m2))= 1.61E−02+((1.61E−02)−(1.61E−02))×((1−0.24)/(1.49−0.24))=4.97E−02

FIG. 12 is an explanatory diagram of an example of derivation of the threshold value for the degree of agglomeration in a case where the constraint condition is that of an attachment at both ends. FIG. 12 depicts an example where the threshold value for the degree of agglomeration is determined using the degree of agglomeration and the analysis time period in the case where the constraint condition is that of the attachment at both ends for each of the models m2 and m3 depicted in FIG. 6. An example of the case for 5,000 elements will be taken for each of the models m2 and m3. A hatched portion of each of the models m2 and m3 is the portion to be constrained.

The example of the calculation of the degree of agglomeration of each of the models m2 and m3 for each of the determination methods 1 to 5 is as depicted in FIG. 8.

The structural analysis apparatus 100 calculates the strength of the constraint condition for each of the models m2 and m3 based on equation (6). The number of the degrees of the constraint freedom per one node point and the number of the degrees of freedom per one node point are each 3 and will not again be described.

The constraint condition is that of the attachment at both ends type and the dimensions of the model m2 are "50× 100×1,000". The constraint area of the model m2 is therefore "50×100×2" and is thereby "1.00E+04". The constraint condition is that of the attachment at both ends type and the dimensions of the model m3 are "50×100×200". The constraint area of the model m3 is therefore "50×100×2" and is thereby "1.00E+04".

The strength of the constraint condition of the model m2 is "(1.00E+04)/(3.10E+05)" and thereby is "3.23E−02". The strength of the constraint condition of the model m3 is "(1.00E+04)/(7.00E+04)" and thereby is "1.43E−01".

The structural analysis apparatus 100 determines the analysis time period by executing the numerical analysis using each of the direct method and the iterative method for each of the models m2 and m3. The structural analysis apparatus 100 calculates the performance ratio of the analysis time period based on the direct method and the analysis time period based on the iterative method.

The performance ratio of the model m2 is "0.38" and the performance ratio of the model m3 is "2.11".

The structural analysis apparatus 100 determines the degree of agglomeration by linear interpolation in each of the determination methods 1 to 5 for the case where the performance ratio of the analysis time period based on the direct method and the analysis time period based on the iterative method is 1, and employs this value as the threshold value. The structural analysis apparatus 100 determines the strength of the constraint condition that corresponds to the threshold value for this degree of agglomeration. For example, the structural analysis apparatus 100 calculates the strength of the constraint condition in the case where the performance ratio is 1 using the linear interpolation based on the strength of the constraint condition of the model m2, the strength of the constraint condition of the model m3, the performance ratio of the model m2, and the performance ratio of the model m3. The Lagrange interpolation, the spline interpolation, or the least-square method may be used instead of the linear interpolation.

The strength of the constraint condition in the case where the performance ratio is 1=strength of the constraint condition of model m2+(strength of the constraint condition of model m3−strength of the constraint condition of model m2)×((1−performance ratio of model m2)/(performance ratio of model m3−performance ration of model m2))= (3.23E−02)+((1.43E−01)−(3.23E−02))×((1−0.38)/(2.11−0.38))=7.20E−02

The correcting unit 406 corrects the threshold value for the degree of agglomeration based on, for example, the strength of the constraint condition calculated by the third evaluating unit 404.

Figure 13:
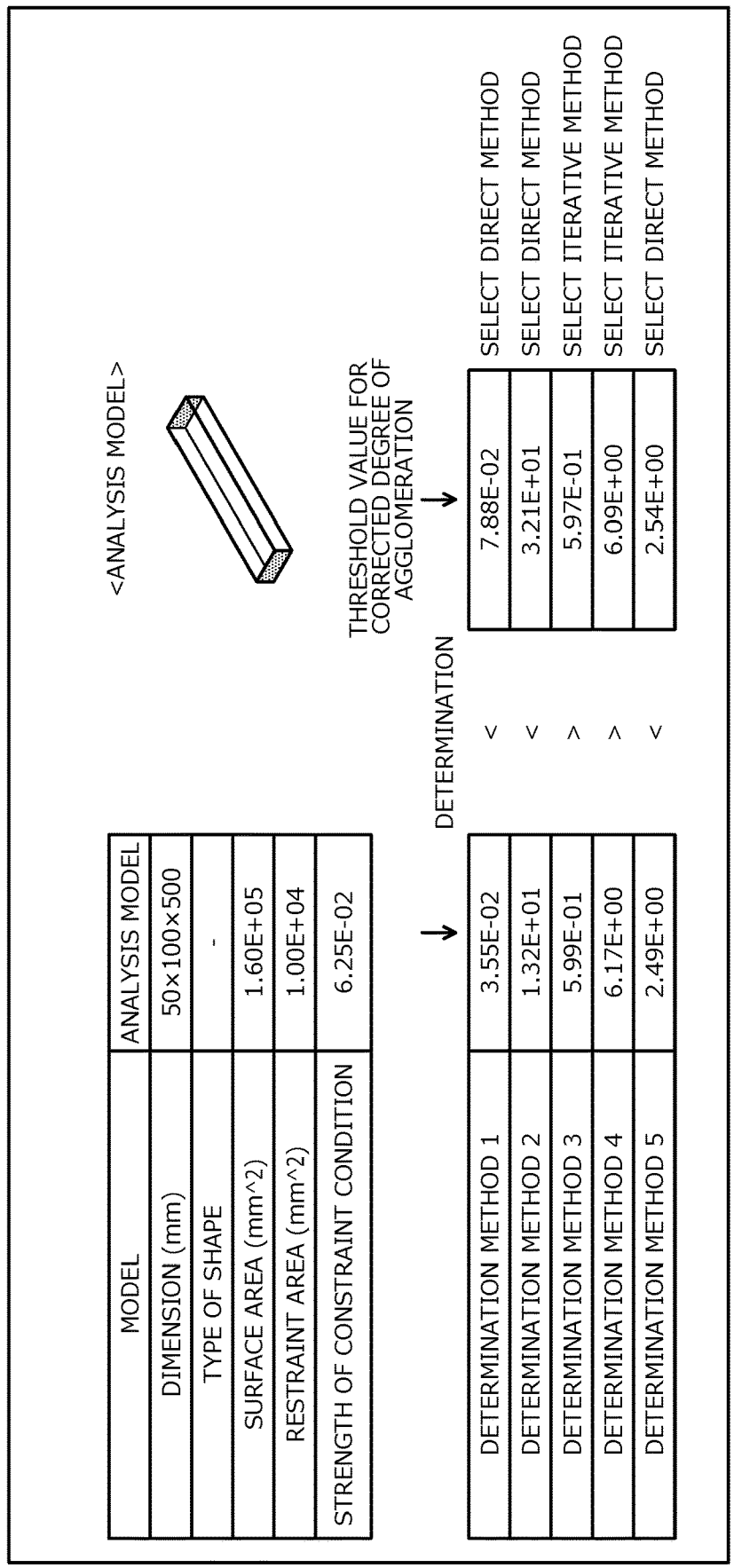
FIG. 13 is an explanatory diagram of an example of correction of the threshold value for the degree of agglomeration based on a strength of the constraint condition and an example of the selection of the solution method.

FIG. 13 is an explanatory diagram of an example of the correction of the threshold value for the degree of agglomeration based on the strength of the constraint condition and an example of the selection of the solution method. The correcting unit 406 corrects the threshold value by the linear interpolation by, for example, comparing the strength of the constraint condition that corresponds to the case where the performance ratio is 1, and the strength of the constraint condition of the analysis model. The Lagrange interpolation, the spline interpolation, or the least-square method may be used instead of the linear interpolation.

The strength of the constraint condition of the analysis model is "(1.00E+04)/(1.60E+5)" and thereby is "6.25E−0.2".

The correction of the threshold value will be described taking an example of the determination method 1. The threshold value after the correction may be determined as follows. The threshold value for the attachment at one end type in the determination method 1 is "1.00E−01" as depicted in FIG. 11 and the threshold value for the attachment at both ends type therein is "6.30E−02" as depicted in FIG. 12.

threshold value after correction=threshold value for attachment at one end type+(threshold value for attachment at both ends type−threshold value for attachment at one end type)×((strength of the constraint condition of analysis model−strength of the constraint condition corresponding to case where performance ratio is 1 for attachment at one end type)/(strength of the constraint condition corresponding to case where performance ratio is 1 for attachment at both ends type−strength of the constraint condition corresponding to case where performance ratio is 1 for attachment at one end type))=(1.00$E$−01)+(6.30$E$−02)−(1.00$E$−01))× (((6.25$E$−02)−(4.97$E$−02))/((7.20$E$−02)−(4.97$E$−02))= 7.88$E$−02

A function may be produced that may determine the threshold value after the correction when the strength of the constraint condition of the analysis model is given to the function based on the threshold value for each of the constraint conditions and the strength of the constraint condition. The correcting unit 406 may determine the threshold value that corresponds to the strength of the constraint condition by giving the strength of the constraint condition of the analysis model to the function.

The correcting unit 406 calculates the threshold value that corresponds to the strength of the constraint condition in a manner similar to that of the determination method 1 also for each of the determination methods 2 to 5. The selecting unit 405 selects either the direct method or the iterative method depending on whether the calculated degree of agglomeration is at least the corrected threshold value.

In the example depicted in FIG. 13, in the determination method 1, the selecting unit 405 selects the direct method. In the determination method 2, the selecting unit 405 selects the direct method. In the determination method 3, the selecting unit 405 selects the iterative method. In the determination method 4, the selecting unit 405 selects the iterative method. In the determination method 5, the selecting unit 405 selects the direct method.

As depicted in FIG. 13, a case is present where the solution method selected according to the determination method differs. The selecting unit 405 may select the solution method for each of the plural determination methods and may output the result of the selection. In this manner, by outputting the result of the selection for each of the determination methods, a user may be caused to select the final solution method.

The selecting unit 405 may select the solution method for each of the plural determination methods and may select the solution method selected by more determination methods as the final solution method. The selecting unit 405 may select the solution method using some determination methods of the plural determination methods.

The selecting unit 405 may select the solution method based on, for example, three items including the degree of agglomeration, the model scale, and the strength of the boundary condition. The selecting unit 405 not only may correct the threshold value based on the strength of the boundary condition and select the threshold value corresponding to the model scale described above, but also may select the solution method for each of the degree of agglomeration, the model scale, and the strength of the boundary condition.

Figure 14:
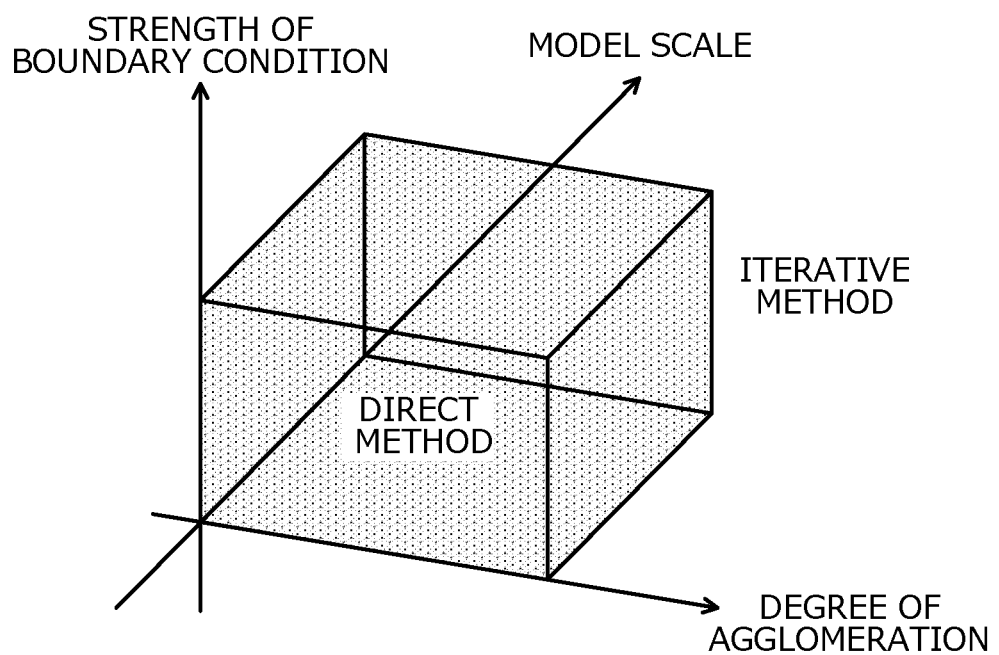
FIG. 14 is an explanatory diagram of an example of the selection of the solution method.

FIG. 14 is an explanatory diagram of an example of the selection of the solution method. A boundary based on the threshold value or a curved face may be set in advance between a region to select the direct method and a region to select the iterative method, in a three-dimensional space using the degree of agglomeration, the model scale, and the strength of the boundary condition as three variables. The selecting unit 405 may select the solution method from the direct method and the iterative method depending on in which region each of the calculated determination values is included in the three-dimensional space. In the example depicted in FIG. 14, the selecting unit 405 selects the direct method when each of the three variables of the degree of agglomeration, the model scale, and the strength of the boundary condition is within the threshold value, and selects the iterative method when any one of the three variables of the degree of agglomeration, the model scale, and the strength of the boundary condition is not within the threshold value.

In the example depicted in FIG. 14, while the boundary is set based on the threshold value, the boundary may be set based on the curved face. When plural evaluation methods are present for each of the degree of agglomeration, the model scale, and the strength of the boundary condition, the selecting unit 405 may select the solution method from the direct method and the iterative method based on the boundary of the threshold value setting an N-dimensional space based on a combination including some of the plural evaluation methods. As described above, examples of the plural evaluation methods include, for example, the determination methods 1 to 5 for the degree of agglomeration, the number of the node points, the number of the elements, and the number of the degrees of analysis freedom for the model scale, and the strength of the constraint condition and the weakness of the loading condition for the strength of the boundary condition.

In the above examples, while the selecting unit 405 selects either the iterative method or the direct method, the selection is not limited to this and, for example, any one solution method may be selected from plural types of iterative method and plural types of direct method, or plural threshold values may be set and any one solution method may be selected from the plural solution methods. While the direct method and the iterative method have been taken as the examples, the solution methods are not limited to these and the solution methods may include other solution methods. The selecting unit 405 selects the numerical analysis algorithm of the structural analysis that uses the finite element method of the model based on, for example, the result of the evaluation of the degree of agglomeration of the model. The method of setting the threshold value only has to be executed in a manner similar to that of the method of setting the threshold value for selecting the iterative method or the direct method described above and will not again be described in detail.

Figure 15:
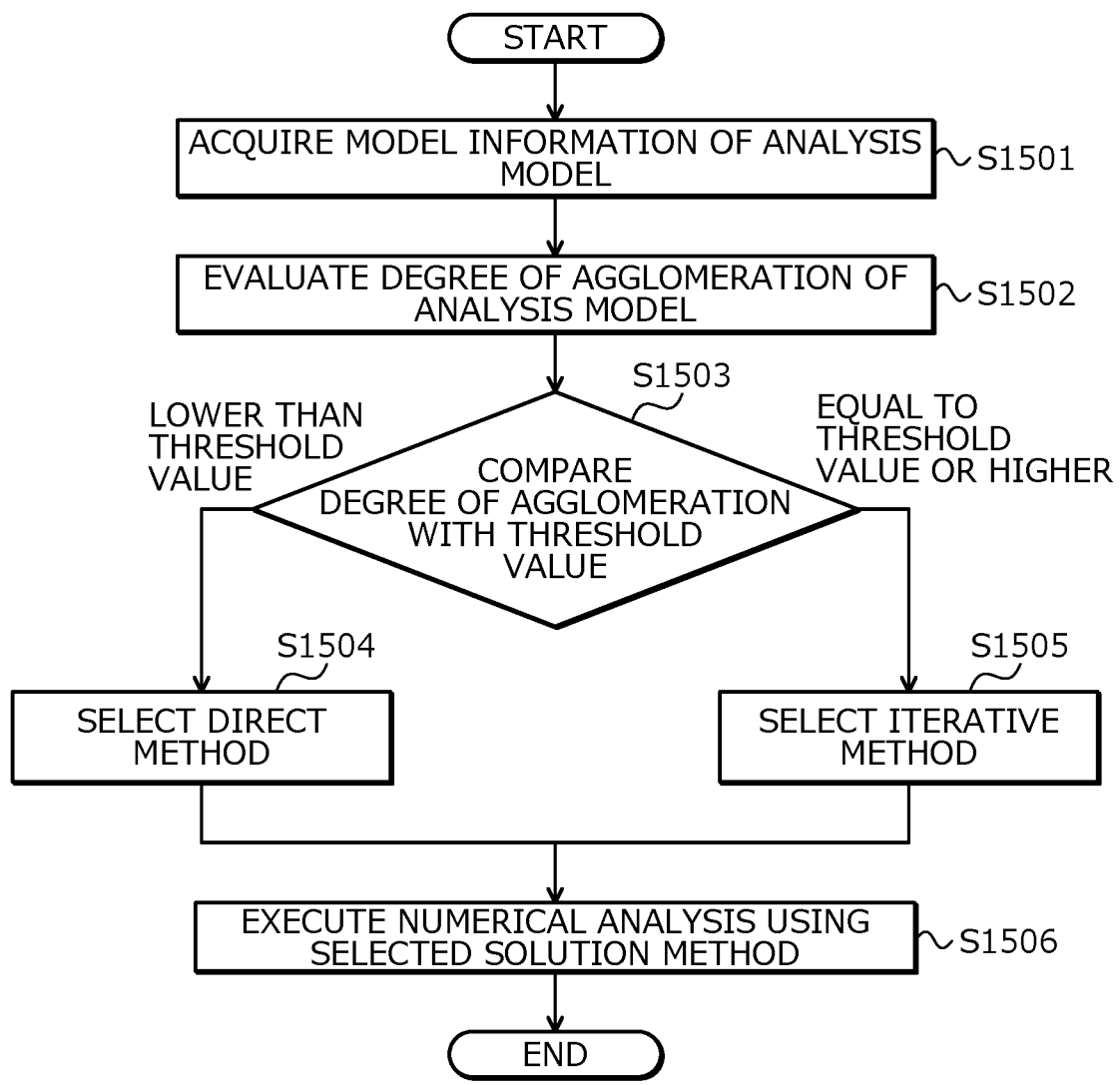
FIG. 15 is a flowchart of an exemplary procedure 1 for a structural analysis process executed by the structural analysis apparatus.

FIG. 15 is a flowchart of an exemplary procedure 1 for the structural analysis process executed by the structural analysis apparatus. The structural analysis apparatus 100 acquires the model information 111 of the analysis model (step S1501).

The structural analysis apparatus 100 evaluates the degree of agglomeration of the analysis model (step S1502). The structural analysis apparatus 100 compares the degree of agglomeration with the threshold value (step S1503).

When the degree of agglomeration is lower than the threshold value (step S1503: LOWER THAN THRESHOLD VALUE), the structural analysis apparatus 100 selects the direct method (step S1504) and transitions to the operation at step S1506. When the degree of agglomeration is equal to the threshold value or higher (step S1503: EQUAL TO THRESHOLD VALUE OR HIGHER), the structural analysis apparatus 100 selects the iterative method (step S1505) and transitions to the operation at step S1506. The structural analysis apparatus 100 executes the numerical analysis using the selected solution method (step S1506) and causes the series of operations to come to an end.

Figure 16:
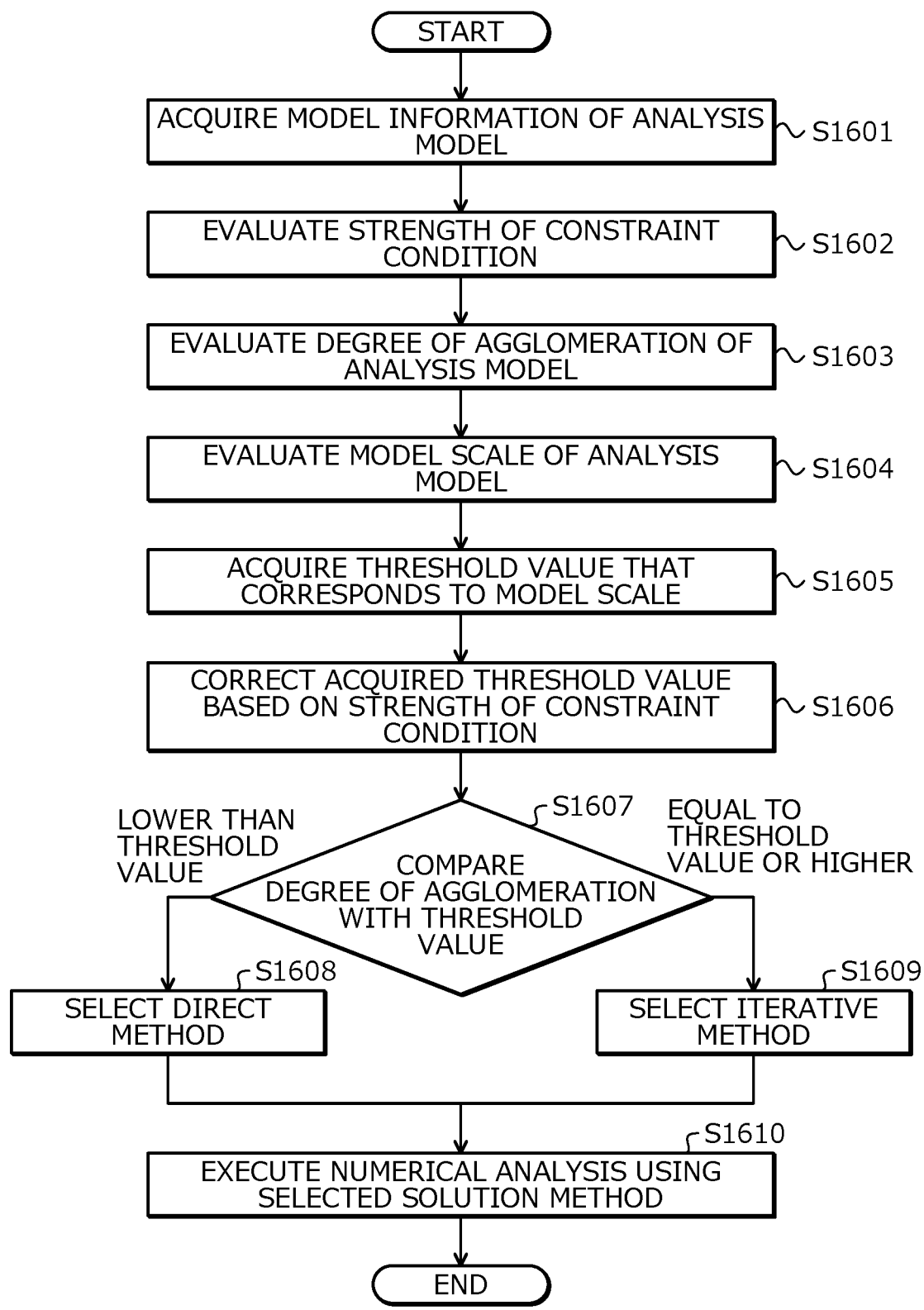
FIG. 16 is a flowchart of an exemplary procedure 2 for the structural analysis process executed by the structural analysis apparatus.

FIG. 16 is a flowchart of an exemplary procedure 2 for the structural analysis process executed by the structural analysis apparatus. The structural analysis apparatus 100 acquires the model information 111 of the analysis model (step S1601).

The structural analysis apparatus 100 evaluates the strength of the constraint condition (step S1602). The structural analysis apparatus 100 evaluates the degree of agglomeration of the analysis model (step S1603). The structural analysis apparatus 100 evaluates the model scale of the analysis model (step S1604). The structural analysis apparatus 100 acquires the threshold value that corresponds to the model scale (step S1605).

The structural analysis apparatus 100 corrects the acquired threshold value based on the strength of the constraint condition (step S1606). The structural analysis apparatus 100 compares the degree of agglomeration with the threshold value (step S1607). When the degree of agglomeration is lower than the threshold value (step S1607: LOWER THAN THRESHOLD VALUE), the structural analysis apparatus 100 selects the direct method (step S1608).

When the degree of agglomeration is equal to the threshold value or higher (step S1607: EQUAL TO THRESHOLD VALUE OR HIGHER), the structural analysis apparatus 100 selects the iterative method (step S1609). The structural analysis apparatus 100 executes the numerical analysis using the solution method selected based on the selected calculation resource (step S1610) and causes the series of operations to come to an end.

Figure 17:
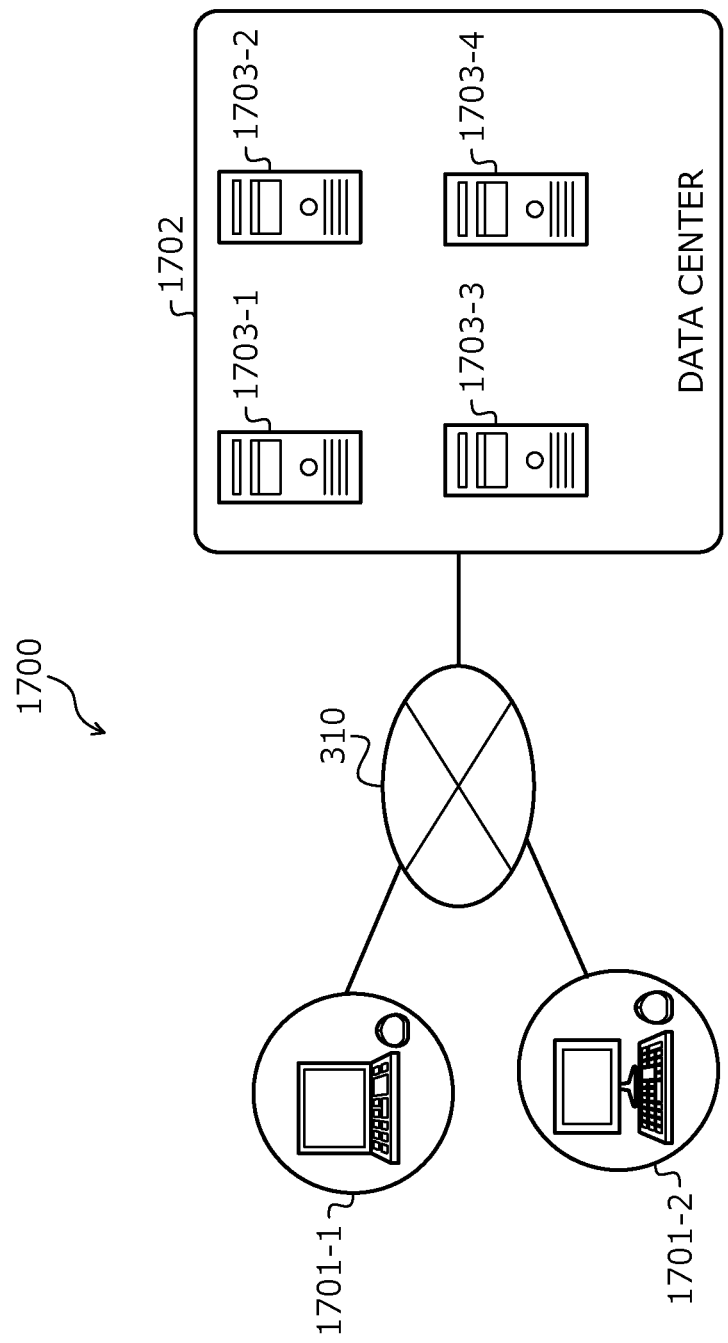
FIG. 17 is an explanatory diagram of an example of system application.

FIG. 17 is an explanatory diagram of an example of system application. A system 1700 includes, for example, a client terminal apparatus 1701 and a data center 1702. Plural client terminal apparatuses 1701 may be present as depicted in FIG. 17. The data center 1702 includes, for example, plural servers 1703. The client terminal apparatuses 1701 and the data center 1702 are connected to each other through a network 310. The management method of the servers 1703 in the data center 1702 is not especially limited.

The structural analysis apparatus 100 may be realized by the client terminal apparatus 1701 and the plural servers 1703. For example, the acquiring unit 401, the first evaluating unit 402 to the third evaluating unit 404, and the correcting unit 406 may be realized by the client terminal apparatus 1701, and the selecting unit 405 may be realized by the server 1703. In this case, it may be determined in advance which one of the servers 1703 of the data center 1702 executes the process.

While no detailed example of the hardware configuration of each of the client terminal apparatus 1701 and the server 1703 is depicted, the hardware configuration may be same as the hardware configuration of the structural analysis apparatus 100 depicted in FIG. 3. The server 1703 may omit input and output devices such as the keyboard 307, the mouse 308, and the display 309.

The server 703 executes, for example, the CAD and the CAE. For example, the client terminal apparatus 1701 acquires the model information 111 produced by the CAE and evaluates the degree of agglomeration. The client terminal apparatus 1701 transmits the evaluated degree of agglomeration to the server 1703. Not limiting to the degree of agglomeration, the client terminal apparatus 1701 may transmit the evaluated model scale and the strength of the boundary condition to the server 1703. The server 1703 selects either the iterative method or the direct method as the solution method based on the degree of agglomeration and executes the numerical analysis using the selected solution method. In this case, the server 1703 may register the actual results of the past analyses into a database. The server 1703 may select the solution method based on the degree of agglomeration received from the client terminal apparatus 1701.

FIG. 18 is an explanatory diagram of an example of an analysis database. The analysis database 1800 includes the fields for, for example, the model ID, a degree of agglomeration 1, a degree of agglomeration 2, a degree of agglomeration 3, a degree of agglomeration 4, a degree of agglomeration 5, the strength of the boundary condition, the model scale, the analysis time period for a direct method A, the analysis time period for a direct method B, the analysis time period for an iterative method C, and the analysis time period for an iterative method D. Information is set in the fields and is thereby stored as records (1801-1 and 1801-2). The analysis database 1800 is realized by a storage device such as, for example, the ROM 302, the RAM 303, or the disk 305.

The field for the model ID has identification information set therein that identifies the model. The field for the degree of agglomeration 1 has the degree of agglomeration in the determination method 1 for the model indicated by the model ID, set therein. The field for the degree of agglomeration 2 has the degree of agglomeration in the determination method 2 for the model indicated by the model ID, set therein. The field for the degree of agglomeration 3 has the degree of agglomeration in the determination method 3 for the model indicated by the model ID, set therein. The field for the degree of agglomeration 4 has the degree of agglomeration in the determination method 4 for the model indicated by the model ID, set therein. The field for the degree of agglomeration 5 has the degree of agglomeration in the determination method 5 for the model indicated by the model ID, set therein. The field for the strength of the boundary condition has the strength of the boundary condition of the model indicated by the model ID set therein. For example, this field has the strength of the constraint condition set therein. The field for the model scale has the model scale of the model indicated by the model ID set therein. For example, this field has the number of the elements set therein.

The field for the analysis time period for the direct method A has the analysis time period set therein that is necessary for the numerical analysis executed using the direct method A. The field for the analysis time period for the direct method B has the analysis time period set therein that is necessary for the numerical analysis executed using the direct method B. The field for the analysis time period for the iterative method C has the analysis time period set therein that is necessary for the numerical analysis executed using the iterative method C. The field for the analysis time period for the iterative method D has the analysis time period set therein that is necessary for the numerical analysis executed using the iterative method D. In this manner, the field for the analysis time period is prepared for each of the prepared various solution methods and the methods of preprocessing because the various methods are present as the solution methods.

The dimensions, the volume, the mesh size, the element type, and the like of the model may be stored without limitation to those in the fields depicted in FIG. 18. Calculation resource information may be stored concerning the calculation resource assigned in the execution of the analysis and the actual result values that are actually needed, such as the memory capacity and the number of the CPUs.

Figure 19:
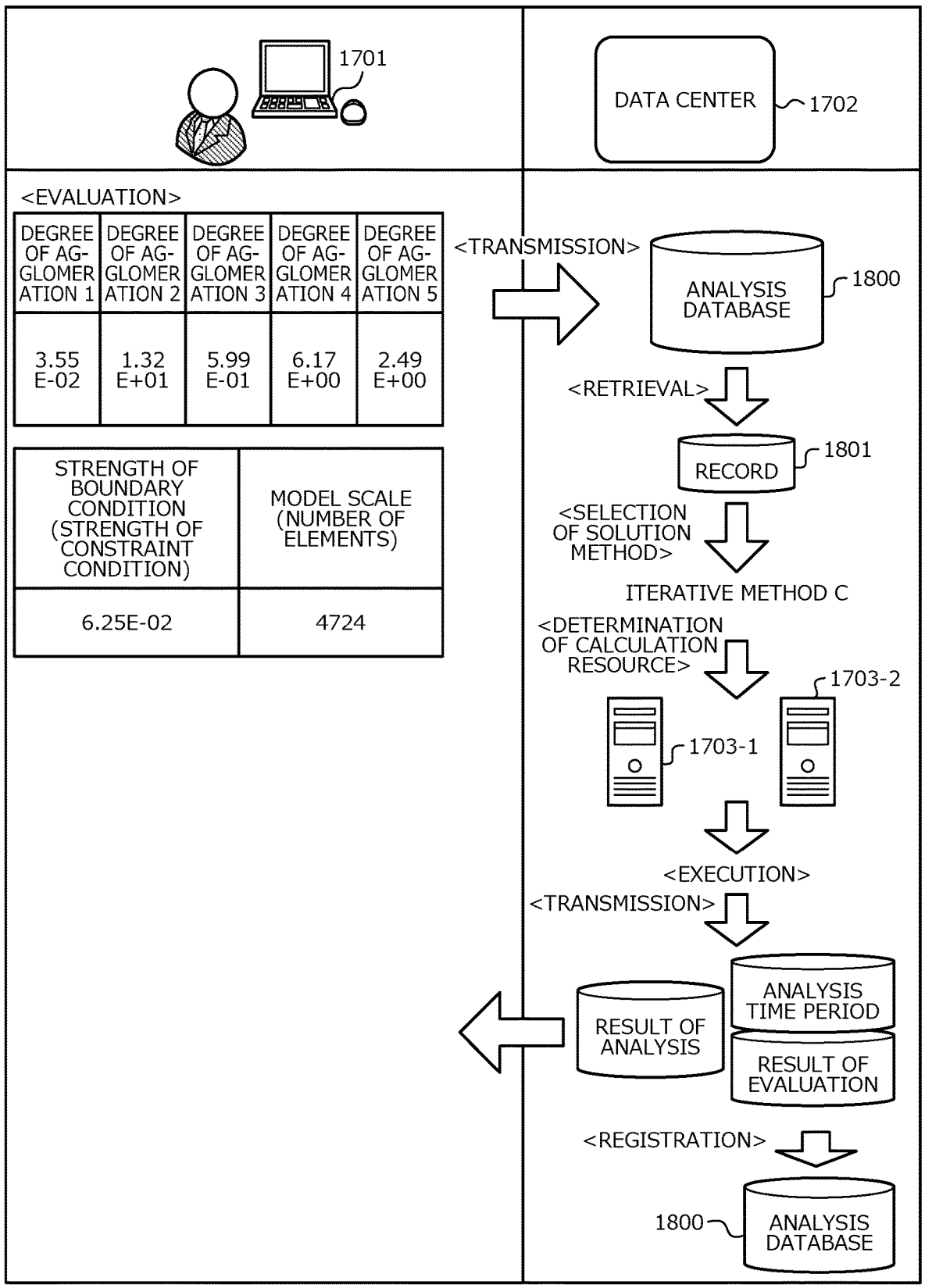
FIG. 19 is an explanatory diagram of an example of the selection of the solution method based on an actual result of a system.

FIG. 19 is an explanatory diagram of an example of the selection of the solution method based on the actual result of the system. The client terminal apparatus 1701 transmits to the server 1703, the evaluation results such as, for example, the degree of agglomeration, the strength of the constraint condition, and the model scale. The server 1703 retrieves from the analysis database 1800, the record having therein the evaluation results that are closest to the evaluation results received from the client terminal apparatus 1701. For example, the server 1703 may compare the evaluation results with the evaluation results in the record included in the analysis database 1800 to detect the record having therein the closest evaluation results by scoring the degree of similarity.

The server 1703 selects, as the solution method for the analysis model, the solution method with the shortest analysis time period of the analysis time periods for the solution method included in the detected record. In the example depicted in FIG. 19, the iterative method C is selected. The server 1703 determines the calculation resource based on, for example, the selected solution method and the model scale. In the example depicted in FIG. 19, the analysis is executed using the servers 1703-1 and 1703-2. An example of the determination of the calculation resource will be described with reference to, for example, FIG. 20.

By parallel processing, the servers 1703-1 and 1703-2 execute the numerical analysis for the analysis model using the selected iterative method C.

The server 1703 transmits the result of the analysis to the client terminal. The server 1703 registers the result of the evaluation and the analysis time period as records, into the analysis database 1800.

When the calculation resource is unused, the server 1703 executes the numerical analysis using the solution method that is not selected as the solution method for the analysis model, and registers the analysis time period thereof into the analysis database 1800.

When the degrees of similarity are low for the detected closest results of the evaluation, the server 1703 may compare the degree of agglomeration with the threshold value and select the solution method described above.

FIG. 20 is an explanatory diagram of an example of management of the state of the server and the memory capacity. A table 2000 includes information to manage the state and the resources of the server 1703 located in the data center 1702. The table 2000 includes fields for, for example, the server ID, the state, the memory capacity, the number of the CPUs, and the like.

The field for the server ID has identification information set therein that identifies the server 1703. The field for the state has information set therein that indicates the state of the server 1703. In the example depicted in FIG. 20, the state of the server 1703 is represented by "IN USE" and "NOT USED". For example, the state of the server 1703 may be represented by the number of the CPUs in use, and the like.

The field for the memory capacity has the memory capacities of the RAM 303 and the disk 305 included in the server 1703 set therein. The field for the number of the CPUs has the number of the processors included in, for example, the server 1703 set therein.

An example will be taken where the memory capacities and the numbers of the CPUs are each equal to each other for the servers 1703-1 to 1703-3 while the server 1703-4 has a memory capacity and the number of the CPUs that are larger than those of each of the servers 1703-1 to 1703-3.

Three examples will be taken for three models x to z to be analyzed. It is assumed that the model scales of these models x to z to be analyzed are substantially equal to each other. It is also assumed that the degree of agglomeration of the model x is ax, the degree of agglomeration of the model y is ay, and the degree of agglomeration of the model z is az. The relation among the degrees of agglomeration is ax>the threshold value>ay>az. The iterative method is selected as the solution method for the model x. The direct method is selected as the solution method for the model y. The direct method is selected as the solution method for the model z.

When the direct method is selected, the server 1703 selects the calculation resource whose memory capacity is large. The server 1703 selects, for example, the server 1703-4 as the calculation resource. For the iterative method, the server 1703 selects, for example, any one of the servers 1703-1 to 1703. For example, when plural iterative methods may be selected, the server 1703 may execute simultaneous processing using the plural servers 1703 of the servers 1703-1 to 1703-3 according to the type of the iterative method. For a solution method with which parallel processing may be executed using the plural servers, the server 1703 may select plural calculation resources. The server 1703 may estimate in advance the calculation resources such as the memory capacity necessary for efficient calculation, from the model information, and may select suitable calculation resources according to the result of the estimation.

For example, for the model x, for example, the server 1703-4 is selected as the calculation resource. For the model y, for example, the server 1703-1 is selected as the calculation resource. For the model z, for example, the server 1703-2 is selected as the calculation resource. In this manner, the selecting unit 405 selects the calculation resources for the models to be analyzed.

While an example where the table is used to select the calculation resources has been taken, the procedure for the selection is not especially limited.

FIGS. 21 and 22 are flowcharts of an exemplary procedure for a structural analysis process executed by the system. As described above, the system 1700 includes the client terminal apparatus 1701 and the server 1703. The server 1703 may therefore execute the process depicted in FIGS. 21 and 22 or the client terminal apparatus 1701 may execute the process.

The system 1700 acquires the model information 111 regarding the analysis model using the client terminal apparatus 1701 (step S2101). The system 1700 evaluates the model scale of the analysis model using the client terminal apparatus 1701 (step S2102). The system 1700 evaluates the strength of the boundary condition using the client terminal apparatus 1701 (step S2103).

The system 1700 evaluates the degree of agglomeration of the analysis model using the client terminal apparatus 1701 (step S2104). The system 1700 retrieves the record including the result of the evaluation that is closest to the result of the evaluation of the analysis model, from the analysis database 1800 using the server 1703 (step S2105). The system 1700 selects the solution method with the shortest analysis time period from the record retrieved by the server 1703 (step S2106). The system 1700 executes the numerical analysis using the solution method identified by the server 1703 (step S2107).

The system 1700 outputs the result of the analysis using the server 1703 (step S2201). The system 1700 stores the result of the evaluation and the analysis time period to the database 1800 using the server 1703 (step S2202). The system 1700 determines whether the load of the computer environment is high (step S2203). When the load of the computer environment is high (step S2203: YES), the system 1700 returns to the operation at step S2203. The phrase "The load of the computer environment is high" refers to a state, for example, where a server 1703 not executing any processing is not present.

When the load of the computer environment is low (step S2203: NO), the system 1700 determines whether the server 1703 has executed the analysis using all the solution methods (step S2204). When the system 1700 determines that the server 1703 does not execute the analysis using all the solution methods (step S2204: NO), the system 1700 executes the numerical analysis using the solution method with the shortest analysis time period in the retrieved record, of the unexecuted solution methods (step S2205). The system 1700 stores the analysis time period to the analysis database 1800 (step S2206) and returns to the operation at step S2203. When the system 1700 determines that the server 1703 executes the analysis using all the solution methods (step S2204:YES), the system 1700 causes the series of operations to come to an end.

As described above, the structural analysis apparatus 100 evaluates the degree of agglomeration of the analysis model based on the information indicating the shape of the model, and selects the solution method based on the simultaneous linear equations that use the finite element method. The solution method according to the property of the simultaneous linear equations is thereby selected by determining the feature of the shape of the model, and reduction of the analysis time period can therefore be facilitated.

The degree of agglomeration is evaluated based on the volume of the model and the volume of the smallest sphere or the smallest cube that covers the model. The selection of the solution method may thereby be executed even in the pre-stage of executing the mesh division by the preprocessor of the CAE, and the solution method may be determined easily.

The degree of agglomeration is evaluated based on the volume of the model, the mass of the model, and the principal moment of inertia of the model. In this manner, the solution method is selected according to the shape of the model and the weight of the model. The selection of the solution method may thereby be executed even in the pre-stage of executing the mesh division by the preprocessor of the CAE, and the solution method may be determined easily.

The degree of agglomeration is evaluated based on the number of the elements and the number of the node points of the model. For example, when the analysis model is a plate-rafter-like article, many of the node points are present on the surface of the analysis model and the possibility is therefore low for the number of the node points to each be shared among plural elements. In contrast, when the analysis model is an agglomeration-like article, the possibility is high for the node points to each be shared inside the article. The possibility is therefore high for the model to be the agglomeration-like article when "the number of all the elements/the number of all the node points" is a large value, and the possibility is high for the model to be the plate-rafter-like article when "the number of all the elements/the number of all the node points" is a small value. The iterative method may be caused to be selected for the analysis model that is the agglomeration-like article and the direct method may be caused to be selected for the analysis model that is the plate-rafter-like article. Reduction of the analysis time period may therefore be facilitated. The number of the elements and the number of the node points may be identified easily from the analysis model used for a case where the finite element method is used, and the solution method may therefore be determined easily.

The degree of agglomeration is evaluated based on the sum of the numbers of the degrees of analysis freedom of the elements included in the model and the number of the degrees of analysis freedom of the overall model. For the number of the degrees of analysis freedom, an estimated value thereof may be calculated based on, for example, the number of the node points. The number of the degrees of analysis freedom may be estimated from the analysis model for the case where the finite element method is used, and the solution method may be determined easily. The comparison of the degree of agglomeration may be executed between the models whose element types are different from each other and the general-versatility is therefore high.

The degree of agglomeration is evaluated based on the number of the node points present on the surface of the model among the number of the node points of the model and the number of the node points present inside the model of the number of the node points of the model. For example, when the analysis model is a plate-rafter-like article, many of the node points are present on the surface of the analysis model and the possibility is low for the number of the node points to each be shared among plural elements. In contrast, when the analysis model is an agglomeration-like article, the possibility is high for the node points to be shared inside the article. Whether the shape of the model is close to that of the agglomeration-like article or the shape thereof is close to that of the plate-rafter-like article may be determined based on the ratio of the number of the node points present on the surface and the number of the node points present inside the model. Reduction of the analysis time period may therefore be facilitated.

When the structural analysis apparatus 100 selects the solution method based on the result of the evaluation of the degree of agglomeration of the model, the iterative method more strongly tends to be selected as the degree of agglomeration increases. When the analysis model is a plate-rafter-like article, the solution does not converge in the iterative method and the analysis takes a long time. Reduction of the analysis time period may therefore be facilitated by selecting the direct method when the degree of agglomeration is low. When the analysis model is an agglomeration-like article, the computation amount is increased in the direct method and the analysis takes a long time. Reduction of the analysis time period may therefore be facilitated by selecting the iterative method when the degree of agglomeration is high.

When the structural analysis apparatus 100 selects the solution method based on the result of the evaluation of the degree of agglomeration of the model, the structural analysis apparatus 100 reflects the strength of the boundary condition of the model and/or the model scale of the model, on the selection. The solution method is thereby selected more suitably corresponding to the property of the simultaneous linear equations and reduction of the analysis time period may therefore be facilitated.

When the structural analysis apparatus 100 selects the solution method based on the result of the evaluation of the degree of agglomeration of the model, the structural analysis apparatus 100 more strongly tends to select the iterative method as the strength of the boundary condition of the model is higher. A case is traditionally present where the model is unstable and no convergence occurs in the iterative method such as a case where the constraint condition of the model is insufficient. The direct method therefore tends to be selected when the strength of the boundary condition of the model is low. Reduction of the analysis time period may thereby be facilitated. When the model is stable such as a case where the strength of the boundary condition of the model is high, the iterative method tends to be selected and reduction of the analysis time period may thereby be facilitated.

When the structural analysis apparatus 100 selects the solution method based on the result of the evaluation of the degree of agglomeration of the model, the structural analysis apparatus 100 more strongly tends to select the iterative method as the model scale of the model increases. When the direct method is used, the memory use capacity is large. When the scale of the model is large, the computation amount is large and the memory use capacity increases. When the scale of the model is large, the iterative method with which the memory use capacity is small is selected and reduction of the analysis time period may thereby be facilitated.

When the structural analysis apparatus 100 selects the solution method based on the result of the evaluation of the degree of agglomeration of the model, the structural analysis apparatus 100 changes the selection criterion for the algorithm corresponding to the degree of agglomeration determined by the evaluation, based on the strength of the boundary condition of the model and/or the model scale of the model. The iterative method may be adapted to more strongly tend to be selected as the model scale of the model is a larger scale, and the iterative method may be adapted to more strongly tend to be selected as the strength of the boundary condition of the model is higher.

The structural analysis apparatus 100 calculates the strength of the boundary condition based on the constraint area of the model and the degree of constraint freedom. In this manner, the strength of the boundary condition may easily be evaluated and reduction of the time period necessary for the determination may therefore be facilitated.

The structural analysis apparatus 100 evaluates the model scale based on the number of the elements and/or the number of the node points and/or the number of the degrees of analysis freedom that are calculated from the model information and the mesh size. In this manner, the model scale may easily be evaluated and reduction of the time period necessary for the determination may therefore be facilitated.

The structural analysis apparatus 100 evaluates the degree of agglomeration of the model and/or the model scale and/or the strength of the boundary condition, based on the information that indicates the shape and the boundary condition of the analysis model, selects the numerical analysis algorithm for the structural analysis that uses the finite element method, of the model, and determines the calculation resource to be used in the numerical analysis. The property of the numerical analysis may thereby be determined from the shape of the model and the feature of the boundary condition, and reduction of the analysis time period may therefore be facilitated using the analysis method and the calculation resource according to the property of the numerical analysis.

The structural analysis method described in the present embodiment may be implemented by executing a prepared program on a computer such as a personal computer and a workstation. The structural analysis program is stored on a non-transitory, computer-readable recording medium such as a magnetic disk, an optical disk, and a universal serial bus (USB) flash memory, is read out from the computer-readable medium, and executed by the computer. The program may be distributed through a network such as the Internet.

According to an aspect of the present invention, reduction of the analysis time period may be facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A structural analysis method executed by a computer using a processor coupled to a memory, the structural analysis method by the computer comprising:
by the processor,
acquiring, from the memory, model information of a model of an article subject to analysis,
the model information representing a shape of the article as elements and node points arranged at vertices of each element, among the elements, in form of an aggregation of the elements as a mesh, and used by the processor in a structural analysis of the article in a simulation space using a finite element method (FEM) based on the elements and the node points;
simulating based on a generated FEM model of the article to analyze the model information based on the elements and the node points of the elements in the model information, according to at least one determination method, among a plurality of determination methods, to determine a degree of agglomeration of the model to determine a type of the shape of the article as corresponding to an agglomeration-type shape or a plate-rafter type shape as a property of simultaneous linear equations of a structural analysis solver executed by the processor in a structural analysis of the article in the simulation space using the FEM to determine displacements and stresses of the article; and
selecting a direct method or an iterative method as an algorithm of the structural analysis solver to solve the simultaneous linear equations,
the direct method or the iterative method being selected based on the determined degree of agglomeration of the model as the property of the simultaneous linear equations and a calculation resource including at least one calculation resource among a processor and a memory capacity available for the structural analysis solver based on an estimate of a scale of the model, to cause a reduction in computation time when performing the structural analysis subject to the calculation resource, resulting in reducing an analysis time period of the structural analysis solver.

2. The structural analysis method according to claim 1, wherein the degree of agglomeration is determined based on a volume of the model, and a volume of a smallest sphere or a smallest cube that covers the model.

3. The structural analysis method according to claim 1, wherein the degree of agglomeration is determined based on a volume of the model, a mass of the model, and a principal moment of inertia of the model.

4. The structural analysis method according to claim 1, wherein the degree of agglomeration is determined based on number of elements and number of node points of the model.

5. The structural analysis method according to claim 1, wherein
the degree of agglomeration is determined based on a sum of numbers of degrees of analysis freedom of the elements in the model, and number of degrees of analysis freedom of the model overall.

6. The structural analysis method according to claim 1, wherein
the degree of agglomeration is determined based on a ratio of number of node points present on a surface of the model among number of node points of the model and number of node points other than the node points present on the surface of the model among the number of the node points of the model.

7. The structural analysis method according to claim 1, wherein
the degree of agglomeration is determined based on a ratio of number of node points present on a surface of the model of number among node points of the model and the number of node points of the model.

8. The structural analysis method according to claim 1, wherein
the iterative method tends to be more strongly selected in the selecting as the degree of agglomeration increases.

9. The structural analysis method according to claim 1, wherein
a strength of a boundary condition of the model is further reflected on the selecting.

10. The structural analysis method according to claim 9, wherein
the iterative method tends to be more strongly selected in the selecting as the strength of the boundary condition of the model increases.

11. The structural analysis method according to claim 1, wherein
the iterative method tends to be more strongly selected in the selecting as the model scale of the model increases.

12. The structural analysis method according to claim 1, wherein
a strength of a boundary condition of the model and the model scale of the model are further reflected in the selecting.

13. The structural analysis method according to claim 12, wherein
the strength of the boundary condition is calculated based on a constraint area and a degree of constraint freedom of the model by a constraint condition included in the boundary condition.

14. The structural analysis method according to claim 1, wherein
the estimate of the model scale is based on at least one criteria among criteria of a number of the elements, a number of node points, a number of degrees of analysis freedom that are calculated from the model information, and a size of the mesh.

15. A structural analysis method executed by a computer using a processor coupled to a memory, the structural analysis method by the computer comprising:
by the processor,
acquiring, from the memory, model information of a model of an article subject to analysis,
the model information representing a shape of the article as elements and node points arranged at vertices of each element, among the elements, in form of an aggregation of the elements as a mesh, and used by the processor in a structural analysis of the article in a simulation space using a finite element method (FEM) based on the elements and the node points;
simulating based on a generated FEM model of the article to analyze the model information based on the elements and the node points of the elements in the model information, according to at least one determination method, among a plurality of determination methods, to determine a degree of agglomeration of the model to determine a type of the shape of the article as corresponding to an agglomeration-type shape or a plate-rafter type shape, subject to a strength of a boundary condition of the model and/or a scale of the model, as a property of a numerical analysis algorithm executed by the processor in a structural analysis of the article in the simulation space using the FEM to determine displacements and stresses of the article;

selecting a numerical analysis algorithm for the structural analysis of the article that uses the FEM; and determining a calculation resource to be used by the numerical analysis algorithm based on an estimate of a scale of the model, wherein the numerical analysis algorithm is selected based on the determined degree of agglomeration of the model as the property of the numerical analysis algorithm and the calculation resource, to cause a reduction in computation time when performing the structural analysis within the memory use capacity, resulting in reducing an analysis time period of the structural analysis.

16. A structural analysis apparatus comprising:

a memory; and a processor coupled to the memory, the processor configured to:

acquire, from the memory, model information of a model of an article subject to analysis,
the model information representing a shape of the article as elements and node points arranged at vertices of each element, among the elements, in form of an aggregation of the elements as a mesh, and used by the processor in a structural analysis of the article in a simulation space using a finite element method (FEM) based on the elements and the node points;

simulating based on a generated FEM model of the article to analyze the model information based on the elements and the node points of the elements in the model information, according to at least one determination method, among a plurality of determination methods, to determine a degree of agglomeration of the model to determine a type of the shape of the article as corresponding to an agglomeration-type shape or a plate-rafter type shape as a property of simultaneous linear equations of a structural analysis solver executed by the processor in a structural analysis of the article in the simulation space using the FEM to determine displacements and stresses of the article; and select a direct method or an iterative method as an algorithm of the structural analysis solver to solve the simultaneous linear equations,
the direct method or the iterative method being selected based on the determined degree of agglomeration of the model as the property of the simultaneous linear equations and a calculation resource including at least one calculation resource among a processor and a memory capacity available for the structural analysis solver based on an estimate of a scale of the model, to cause a reduction in computation time when performing the structural analysis subject to the calculation resource, resulting in reducing an analysis time period of the structural analysis solver.

17. A structural analysis apparatus comprising:

a memory; and a processor coupled to the memory, the processor configured to:

acquire, from the memory, model information of a model of an article subject to analysis,
the model information representing a shape of the article as elements and node points arranged at vertices of each element, among the elements, in form of an aggregation of the elements as a mesh, and used by the processor in a structural analysis of the article in a simulation space using a finite element method (FEM) based on the elements and the node points;

simulating based on a generated FEM model of the article to analyze the model information based on the elements and the node points of the elements in the model information, according to at least one determination method, among a plurality of determination methods, to determine a degree of agglomeration of the model to determine a type of the shape of the article as corresponding to an agglomeration-type shape or a plate-rafter type shape, subject to a strength of a boundary condition of the model and/or a scale of the model, as a property of a numerical analysis algorithm executed by the processor in a structural analysis of the article in the simulation space using the FEM to determine displacements and stresses of the article;

select a numerical analysis algorithm for the structural analysis of the article that uses the FEM; and determine a calculation resource to be used by the numerical analysis algorithm based on an estimate of a scale of the model, wherein the numerical analysis algorithm is selected based on the determined degree of agglomeration of the model as the property of the numerical analysis algorithm and the calculation resource, to cause a reduction in computation time when performing the structural analysis within the memory use capacity, resulting in reducing an analysis time period of the structural analysis.

* * * * *